US011159308B2

(12) United States Patent
Schwartz et al.

(10) Patent No.: US 11,159,308 B2
(45) Date of Patent: Oct. 26, 2021

(54) PREVENTING AN ERRONEOUS TRANSMISSION OF A COPY OF A RECORD OF DATA TO A DISTRIBUTED LEDGER SYSTEM

(71) Applicant: PolySign, Inc., Oakland, CA (US)

(72) Inventors: David Schwartz, Tiburon, CA (US); Arthur Britto, San Francisco, CA (US); Chiranjeeb Kataki, San Francisco, CA (US); William Morris, Berkeley, CA (US); Kimon Papahadjopoulos, Oakland, CA (US)

(73) Assignee: POLYSIGN, INC., Oakland, CA (US)

( * ) Notice: Subject to any disclaimer, the term of this patent is extended or adjusted under 35 U.S.C. 154(b) by 401 days.

(21) Appl. No.: 16/359,055

(22) Filed: Mar. 20, 2019

(65) Prior Publication Data

US 2020/0304288 A1 Sep. 24, 2020

(51) Int. Cl.
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3247* (2013.01); *H04L 2209/38* (2013.01); *H04L 2209/56* (2013.01)

(58) Field of Classification Search
CPC ... H04L 9/0637; H04L 9/3247; H04L 9/0643; H04L 2209/38; H04L 2209/56; H04L 63/101; H04L 9/3239; H04L 9/0894
See application file for complete search history.

(56) References Cited

U.S. PATENT DOCUMENTS

| 10,102,265 | B1* | 10/2018 | Madisetti | G06Q 20/06 |
| 2016/0292680 | A1* | 10/2016 | Wilson, Jr. | G06Q 20/40 |
| 2017/0134162 | A1* | 5/2017 | Code | G06F 21/10 |
| 2019/0139047 | A1* | 5/2019 | Ronnow | H04L 9/3236 |
| 2020/0235936 | A1* | 7/2020 | Schnabel | G06F 8/61 |

FOREIGN PATENT DOCUMENTS

| WO | 2017194815 A1 | 11/2017 |
| WO | 2018190809 A1 | 10/2018 |
| WO | 2019034621 A1 | 2/2019 |

OTHER PUBLICATIONS

International Search Report and Written Opinion for Application No. PCT/US2020/023599, dated Jul. 13, 2020, 9 pages.

* cited by examiner

*Primary Examiner* — Matthew Smithers
*Assistant Examiner* — Mirza Israr Javed
(74) *Attorney, Agent, or Firm* — Butzel Long

(57) ABSTRACT

An erroneous transmission, of a record of data, to a distributed ledger system can be prevented. A first operation can confirm that a format of a content within the record of data is correct. A second operation can confirm that formats of elements of a set of information, about authorizations used to cause the record of data to be communicated via the distributed ledger system, are correct. A third operation can confirm that subject matters of the elements and a subject matter of the record of data are the same. A fourth operation can retrieve credentials associated with entities that produced the elements. A fifth operation, using the credentials, can confirm that the entities that produced the elements were authorized to produce them. A sixth operation can confirm that the set of information is sufficient to authorize causing the record of data to be communicated via the distributed ledger system.

32 Claims, 15 Drawing Sheets

FIG. 3

| transaction ID | transferor account no. | transferee account no. | amount of the transfer | identification of initiator |
|---|---|---|---|---|
| 98765 | ESB4321098 | FNB765432 | 700000 | 🔑 |

FIG. 4

| transaction ID | identification of approver |
|---|---|
| 98765 | 🔑 |
| 98765 | 🔑 |

FIG. 5

| type ID | type definition | required information |
|---|---|---|
| 0001 | transaction of less than $1 million | transaction ID, two approvers |
| 0002 | transaction of $1 million or more | transaction ID, three approvers |

FIG. 7

| type ID | modification | ID of modifier | ID of 1st approver | ID of 2nd approver | ID of 3rd approver |
|---|---|---|---|---|---|
| 0002 | need four approvers | 🔑 | 🔑 | 🔑 | 🔑 |

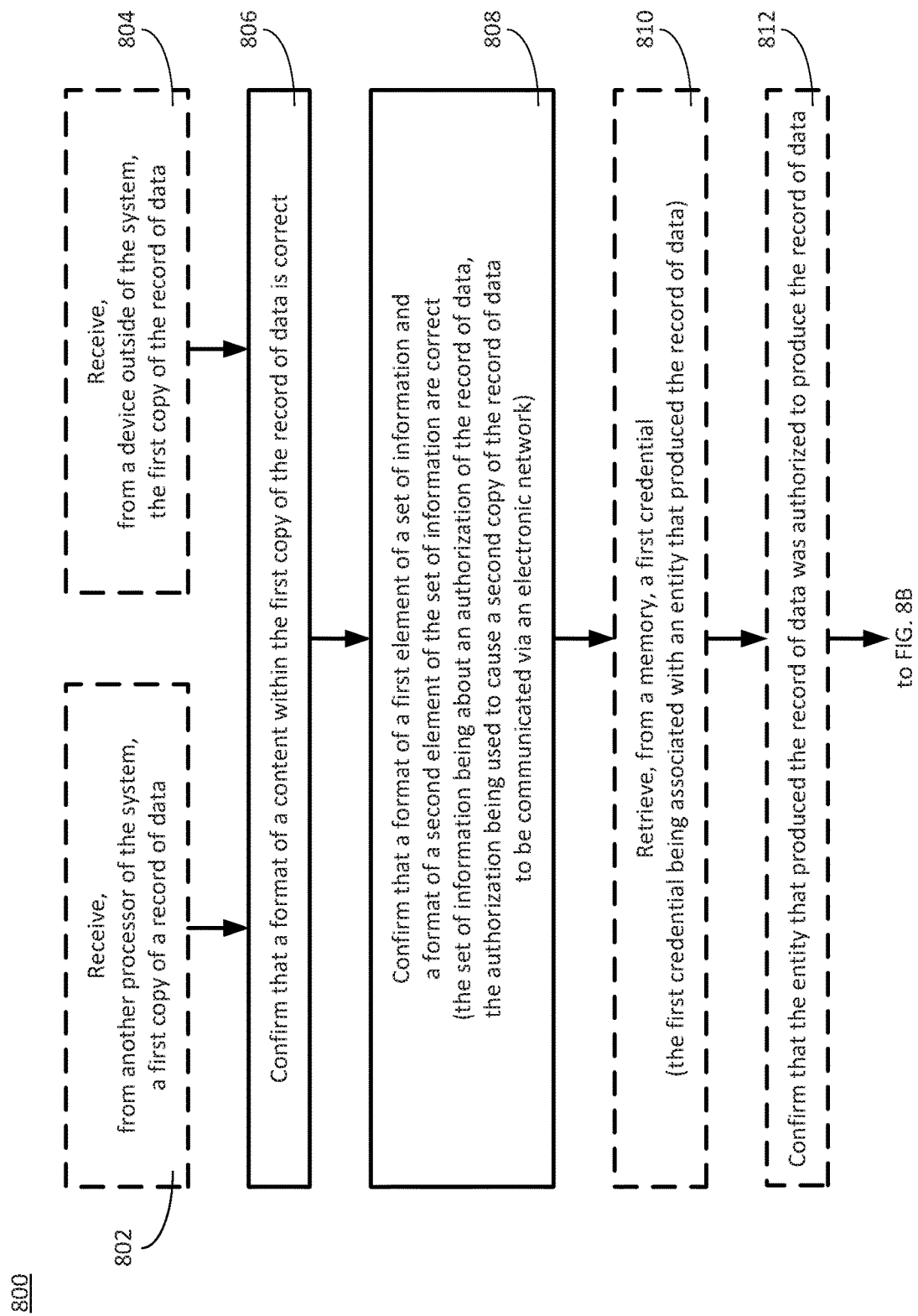

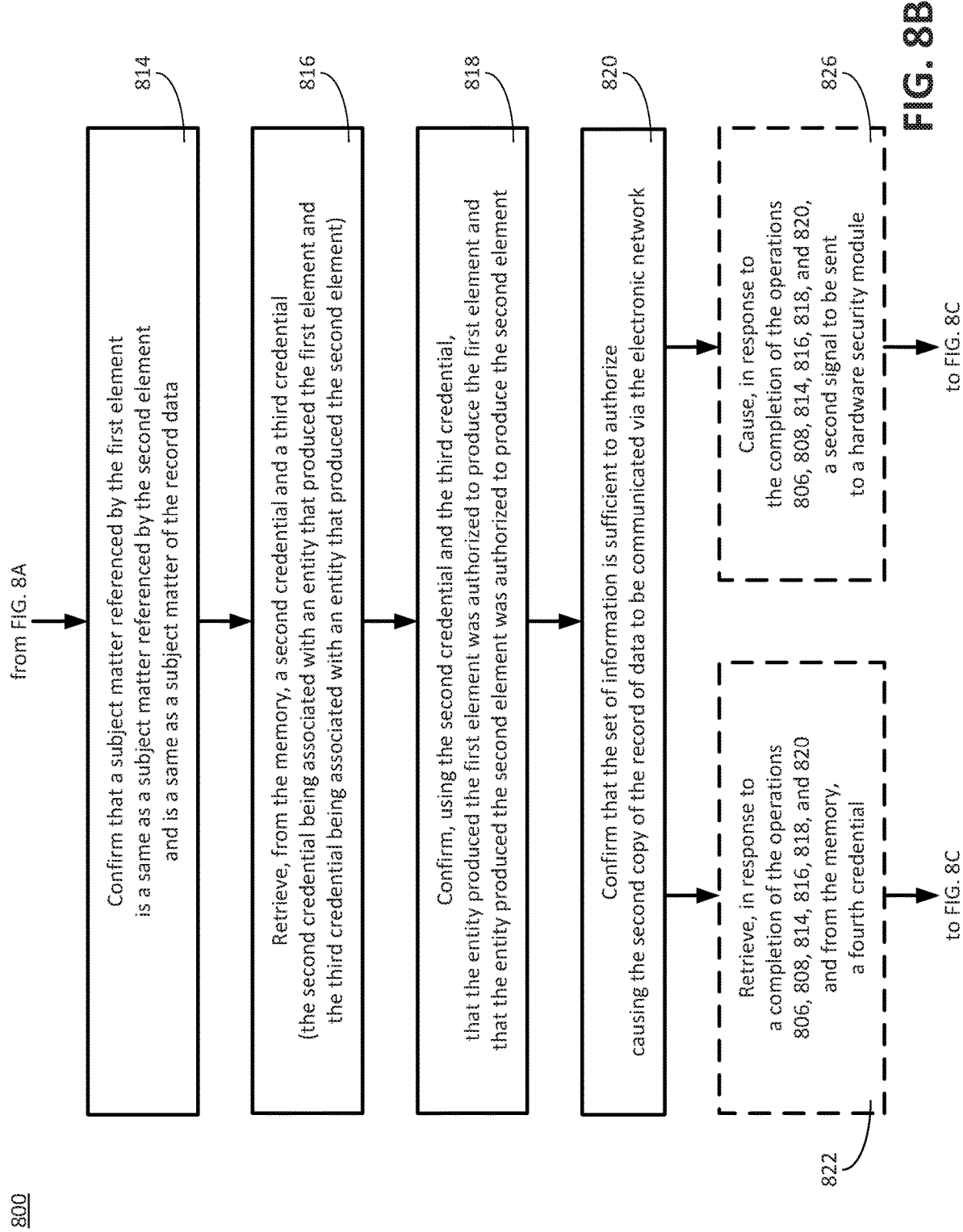

FIG. 8D from FIG. 8C →

Cause, in response to the lack of the completion of the operations 806, 808, 814, 816, 818, and 820, a third signal to be sent (the third signal providing an indication that the requirements have not been met for the second copy of the record of data to be communicated via the electronic network)

— 836

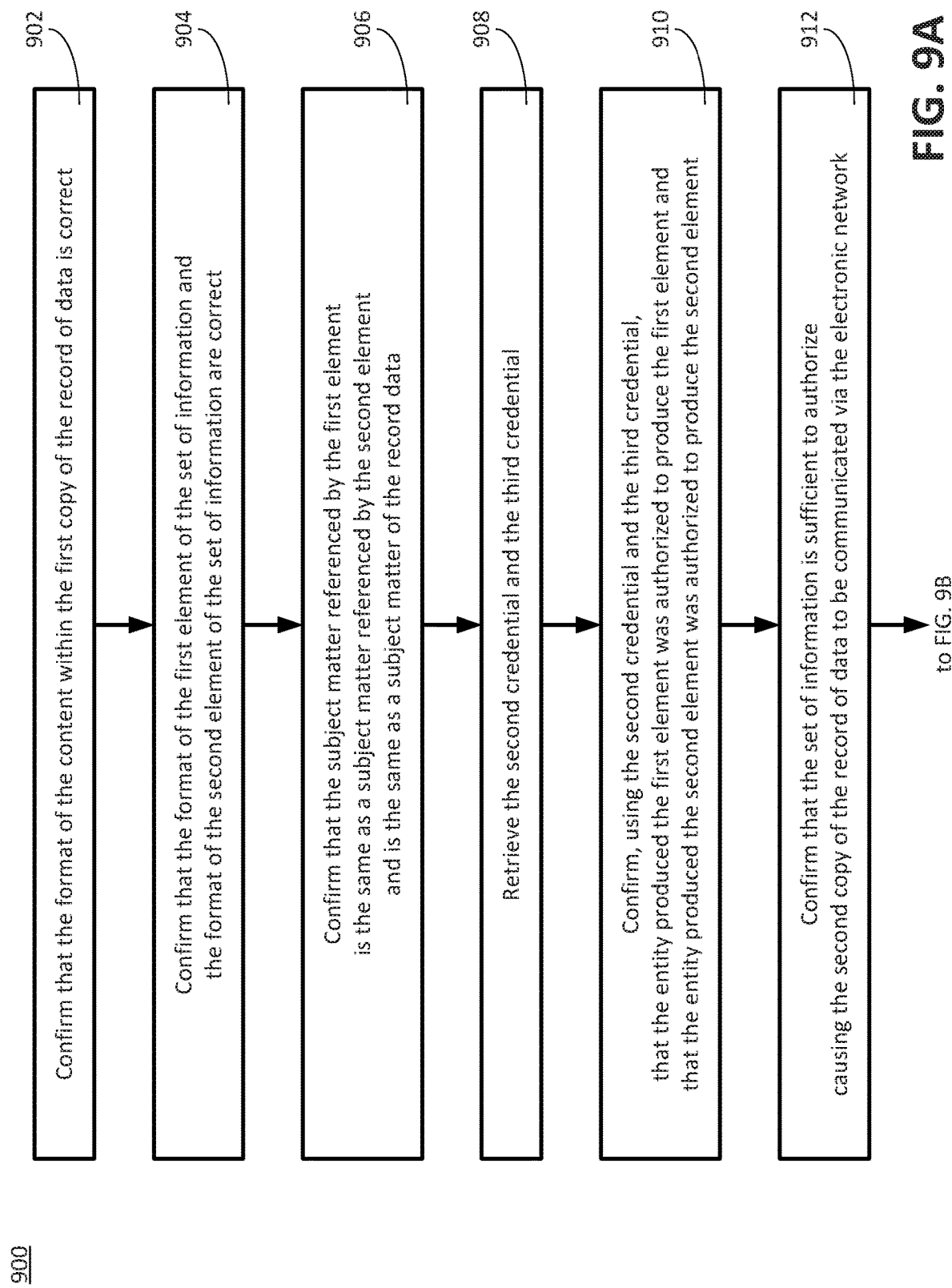

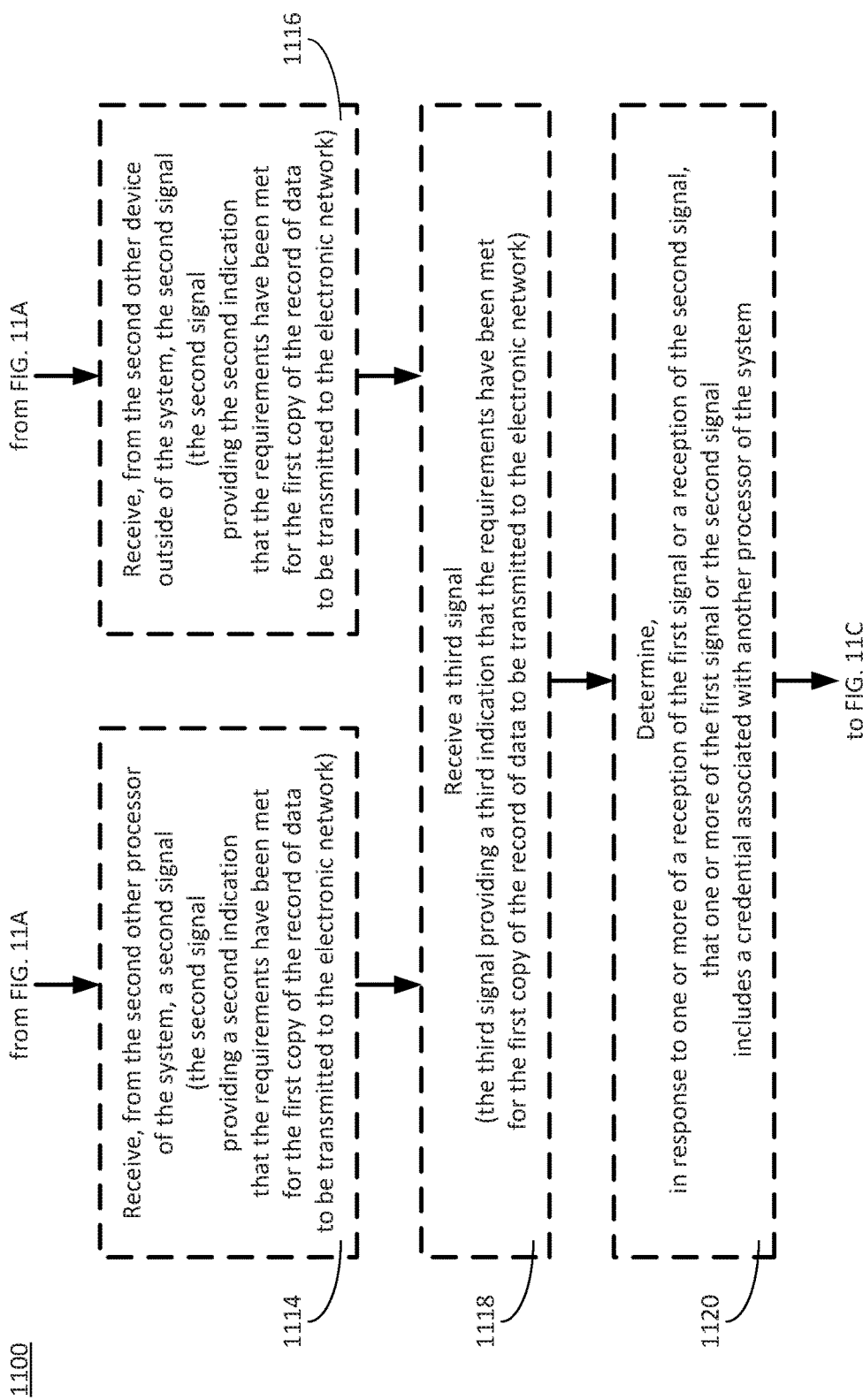

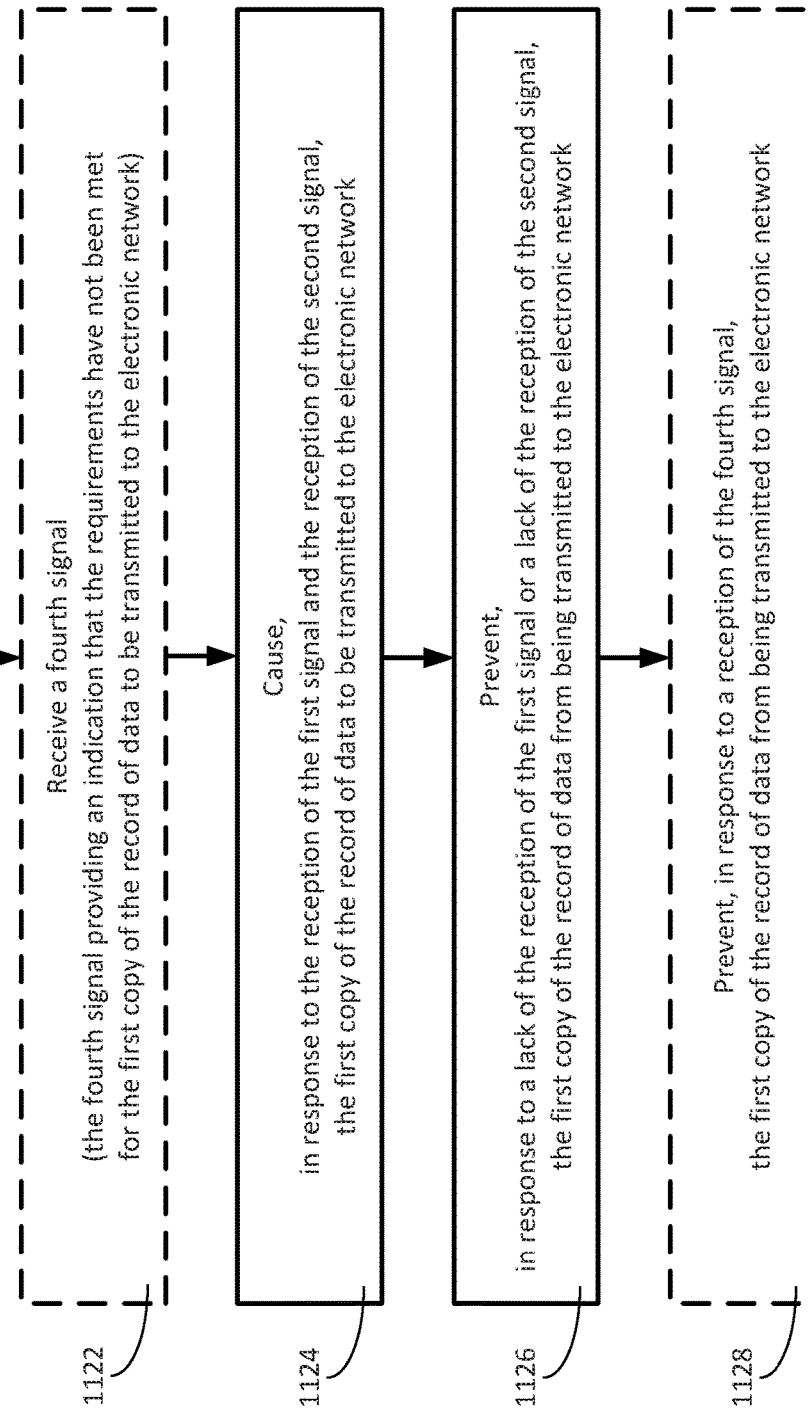

PREVENTING AN ERRONEOUS TRANSMISSION OF A COPY OF A RECORD OF DATA TO A DISTRIBUTED LEDGER SYSTEM

BACKGROUND

A blockchain can be a database that can be used to ensure an authenticity of a record of data. The blockchain can be organized as a sequence of blocks. A block can be added to the blockchain after a discrete duration of time has elapsed since a previous block was added to the blockchain. A block can include one or more records of data received by an electronic ledger system within the discrete duration of time since the previous block was added to the blockchain. A current block can include a hash of the previous block, a timestamp, and the one or more records of data that are a subject of the current block. The hash of the previous block can be a cryptographic hash. Another hash can represent the one or more records of data that are the subject of the current block. The other hash can be, for example, a merkle tree root hash. Because a subsequent block can include a hash of the current block, etc., an alteration of a record of data included in the blockchain can be determined by reference to hashes included in subsequent blocks.

BRIEF DESCRIPTION OF THE DRAWINGS

The accompanying drawings, which are included to provide a further understanding of the disclosed technologies, are incorporated in and constitute a part of this specification. The drawings also illustrate implementations of the disclosed technologies and together with the detailed description serve to explain the principles of implementation of the disclosed technologies. No attempt is made to show structural details in more detail than may be necessary for a fundamental understanding of the disclosed technologies and the various ways in which it can be practiced.

FIG. 3 is a diagram illustrating an example of a format of a content of the record of data, according to the disclosed technologies.

FIG. 4 is a diagram illustrating an example of a format of an element of a set of information, according to the disclosed technologies.

FIG. 5 is a diagram illustrating an example of an information about requirements for sets of information, according to the disclosed technologies.

FIG. 7 is a diagram illustrating an example of a format of an instruction to modify a requirement for causing a transmission of the copy of the record of data to the electronic network, according to the disclosed technologies.

FIGS. 8A through 8D are a flow diagram illustrating an example of a first method for preventing the erroneous transmission of the copy of the record of data to the electronic network, according to the disclosed technologies.

FIGS. 9A and 9B are a flow diagram illustrating an example of a method for performing, by a hardware security module, operations to confirm that requirements have been met for the copy of the record of data to be communicated via the electronic network, according to the disclosed technologies.

FIGS. 11A through 11C are a flow diagram illustrating an example of a second method for preventing the erroneous transmission of the copy of the record of data to the electronic network, according to the disclosed technologies.

DETAILED DESCRIPTION

Figure 1:
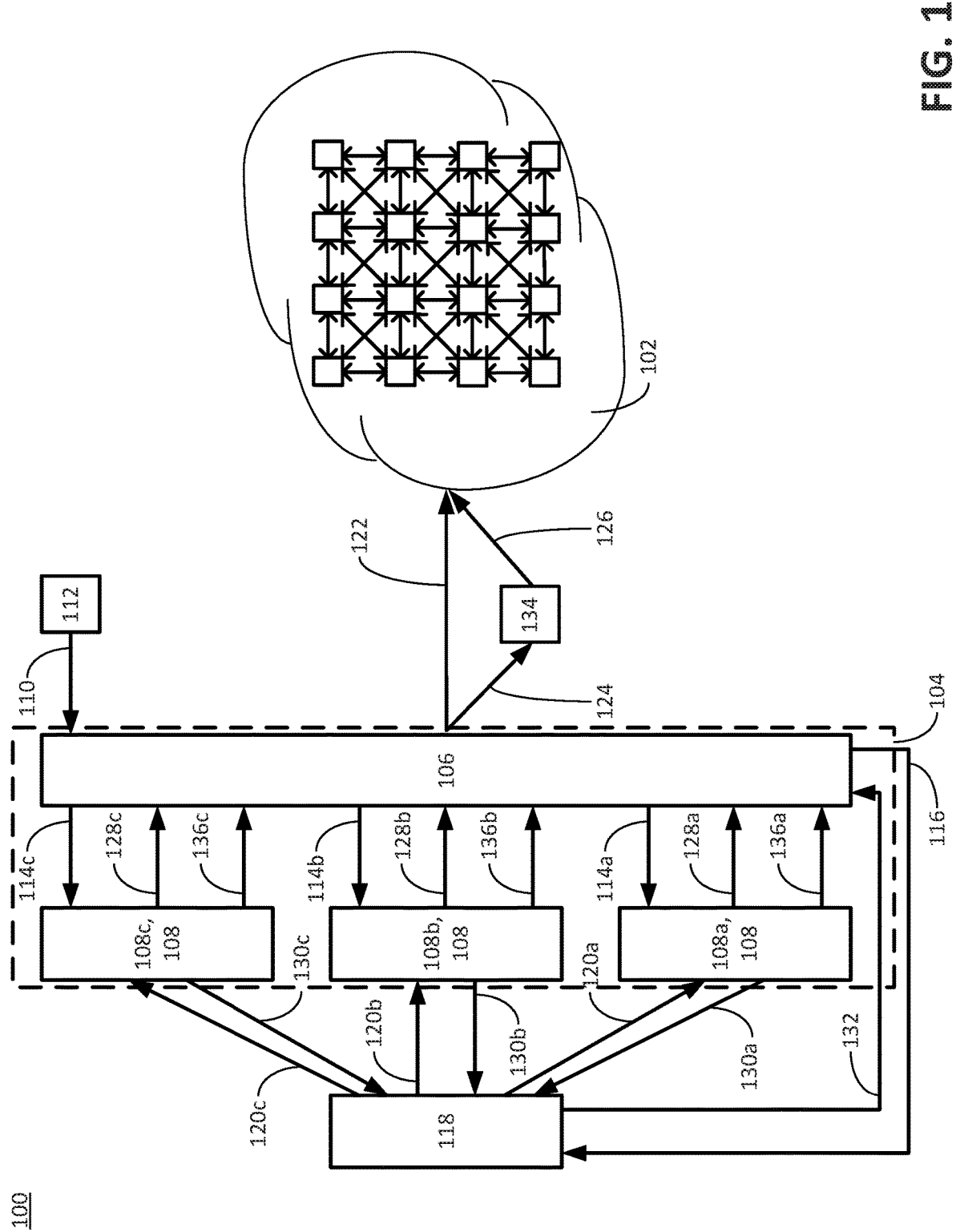
FIG. 1 is a diagram illustrating an example of an environment for preventing an erroneous transmission of a copy of a record of data to an electronic network, according to the disclosed technologies.

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

A blockchain can be a database that can be used to ensure an authenticity of a record of data. The blockchain can be organized as a sequence of blocks. A block can be added to the blockchain after a discrete duration of time has elapsed since a previous block was added to the blockchain. A block can include one or more records of data received by an electronic ledger system within the discrete duration of time since the previous block was added to the blockchain. A current block can include a hash of the previous block, a timestamp, and the one or more records of data that are a subject of the current block. The hash of the previous block can be a cryptographic hash. Another hash can represent the one or more records of data that are the subject of the current block. The other hash can be, for example, a merkle tree root hash. Because a subsequent block can include a hash of the current block, etc., an alteration of a record of data included in the blockchain can be determined by reference to hashes included in subsequent blocks.

The electronic ledger system can operate the blockchain. The electronic ledger system can include an electronic device or, alternatively, can include several electronic devices disposed in a peer-to-peer network. An electronic ledger system in which several electronic devices are disposed in a peer-to-peer network can be referred to as a distributed ledger system. Each electronic device in a distributed ledger system can be referred to as a node of the distributed ledger system. A distributed ledger system can include one or more of a public distributed ledger system or a private distributed ledger system. A private distributed ledger system can also be referred to as a permissioned distributed ledger system, a consortium distributed ledger system, or a hybrid distributed ledger system. In a private distributed ledger system, an entity that controls the private distributed ledger system can vet entities that operate nodes in the private distributed ledger system. Additionally, a private distributed ledger system can allow an entity to keep some information private such as, for example, credential information.

In a distributed ledger system, each node can save a copy of the blockchain. In response to a block being added to the blockchain, each node can update its copy of the blockchain. A consensus algorithm can receive, from the nodes, respective copies of the blockchain. The consensus algorithm can determine a consensus about which of the respective copies of the blockchain is a correct copy of the blockchain. In response to a determination of the consensus, the nodes can update their respective copies of the blockchain to be the correct copy of the blockchain. Because a distributed ledger system can use a consensus algorithm to determine the correct copy of the blockchain, an alteration of a record of data included in a copy of the blockchain stored at a node of the distributed ledger system can be prevented from being deemed to be the correct copy of the record of data. In this manner, a distributed ledger system can be used to ensure an authenticity of a record of data.

Unfortunately, operations performed by a distributed ledger system to update copies of the blockchain, to determine the consensus, and to update respective copies of the blockchain to be the correct copy of the blockchain can consume a substantial amount of time and energy. For example, an average Bitcoin transaction on the Bitcoin.org blockchain consumes about 215 kilowatt-hours of energy. For at least this reason, it is important that a transmission of a copy of the record of data to the distributed ledger system not be done in error and to prevent an erroneous transmission of the copy of the record of data to the distributed ledger system. Particularly, in the case of a record of data associated with a transaction between entities, an erroneous transmission of the copy of the record of data to the distributed ledger system can cause one or more errors in the transaction to the detriment of one or both of the entities associated with the transaction.

The disclosed technologies can prevent an erroneous transmission of a copy of a record of data to a distributed ledger system. A first operation can be performed on a first copy of the record of data. The first operation can confirm that a format of a content within the first copy of the record of data is correct. A second operation can be performed on a set of information. The second operation can confirm that a format of a first element of the set of information and a format of a second element of the set of information are correct. The set of information can be about an authorization of the record of data. The authorization can be used to cause a second copy of the record of data to be communicated via the distributed ledger system. A third operation can be performed on the first element and the second element. The third operation can confirm that a subject matter referenced by the first element is a same as a subject matter referenced by the second element and is a same as a subject matter of the record of data. A fourth operation can be performed. The fourth operation can retrieve, from a memory, a first credential and a second credential. The first credential can be associated with an entity that produced the first element. The second credential can be associated with an entity that produced the second element. A fifth operation can be performed using the first credential and the second credential. The fifth operation can confirm that the entity that produced the first element was authorized to produce the first element and that the entity that produced the second element was authorized to produce the second element. A sixth operation can be performed on the set of information. The sixth operation can confirm that the set of information is sufficient to authorize causing the second copy of the record of data to be communicated via the distributed ledger system. In response to a completion of the first operation, the second operation, the third operation, the fourth operation, the fifth operation, and the sixth operation, a first signal can be caused to be sent. The first signal can provide an indication that requirements have been met for the second copy of the record of data to be communicated via the distributed ledger system. However, in response to a lack of a completion of the first operation, the second operation, the third operation, the fourth operation, the fifth operation, or the sixth operation, the first signal can be prevented from being sent.

FIG. 1 is a diagram illustrating an example of an environment 100 for preventing an erroneous transmission of a copy of a record of data to an electronic network 102, according to the disclosed technologies. The environment 100 can include, for example, the electronic network 102 and a system 104 for preventing an erroneous transmission of a copy of a record of data to the electronic network 102. The system 104 can include, for example, a device 106 and a plurality of other devices 108. The plurality of other devices 108 can include, for example, a device 108a and a device 108b. The record of data can be associated with an item for which an authentication of a copy is important. For example, the record of data can be associated with a transaction, a will or testament, a document related to a quality assurance program, a document to be used as evidence in a judicial proceeding, or the like. The electronic network 102 can include a distributed ledger system. If the record of data is associated with a transaction, then, additionally or alternatively, the electronic network 102 can include one or more of an Automated Clearing House network, a payment rail network, another electronic ledger system, or the like. If the electronic network 102 is a distributed ledger system, then the record of data can be included, by the distributed ledger system, in a block to be added, by the distributed ledger system, to a blockchain.

In a first optional implementation of the disclosed technologies, the device 106 can be configured to receive 110, from a device 112 outside of the system 104, the copy of the record of data.

In a second optional implementation of the disclosed technologies, the device 106 can be configured to send 114a, to the device 108a, the copy of the record of data. The device 108a can be configured to receive 114a, from the device 106, the copy of the record of data. The device 106 can be configured to send 114b, to the device 108b, the copy of the record of data. The device 108b can be configured to receive 114b, from the device 106, the copy of the record of data.

Alternatively, in a third optional implementation of the disclosed technologies, the device 106 can be configured to send 116, to a device 118 outside of the system 104, the copy of record of data. The device 108a can be configured to receive 120a, from the device 118 outside of the system 104, the copy of the record of data. The device 108b can be configured to receive 120b, from the device 118 outside of the system 104, the copy of the record of data.

Figure 2:
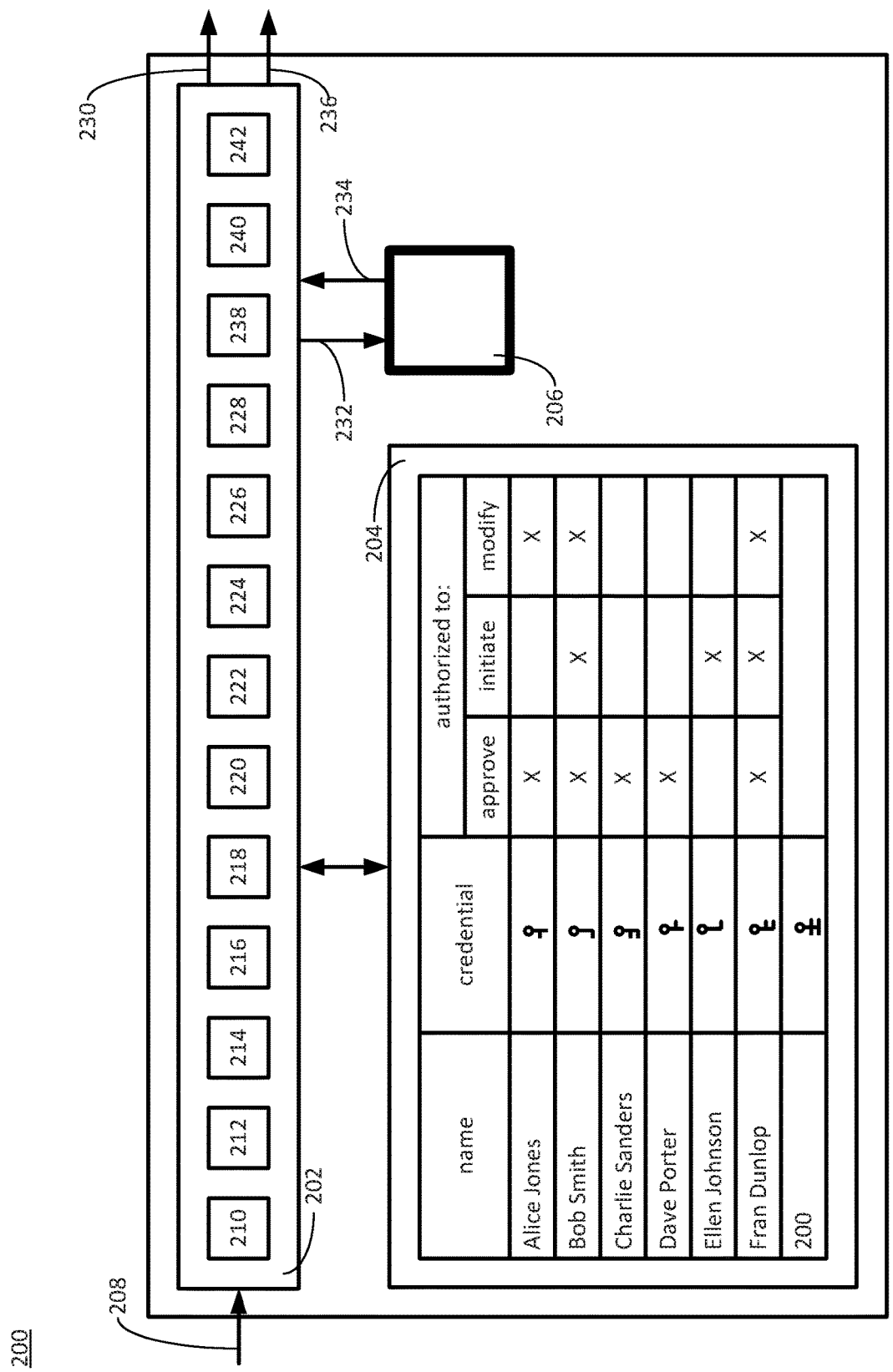
FIG. 2 is a diagram illustrating an example of a device, according to the disclosed technologies.

FIG. 2 is a diagram illustrating an example of a device 200, according to the disclosed technologies. For example, the device 200 can be any of the plurality of other devices 108. The device 200 can include, for example, a processor 202 and a memory 204. Optionally, the device 200 can further include a hardware security module 206.

With reference to FIGS. 1 and 2, the processor 202 can be configured to receive 208 (e.g., 114a or 114b; or 120a or 120b) a first copy of the record of data.

The processor 202 can be configured to perform an operation 210 on the first copy of the record of data. The operation 210 can confirm that a format of a content within the first copy of the record of data is correct.

FIG. 3 is a diagram illustrating an example of a format of a content of the record of data, according to the disclosed technologies. For example, the record of data can be for a transaction of $700,000 from an account at Empire State Bank to an account at First National Bank. For example, the format of content can be: transaction ID, transferor account number, transferee account number, and amount of the transfer. Optionally, the format of the content can include an identification of an initiator of the transaction. For example, with reference to FIGS. 2 and 3, FIG. 3 illustrates that an identification of the initiator of the transaction with transaction ID 98765 is Fran Dunlop.

In a third optional implementation of the disclosed technologies, the processor 202 can be configured to perform an operation 212. The operation 212 can retrieve, from the memory 204, a first credential. The first credential can be associated with an entity that produced the record of data. For example, with reference to FIGS. 2 and 3, FIG. 3 illustrates that the first credential is associated with the entity that produced the record of data, the initiator of the transaction with transaction ID 98765, which is Fran Dunlop.

In the third optional implementation, the processor 202 can be configured to perform, using the first credential, an operation 214. The operation 214 can confirm that the entity that produced the record of data was authorized to produce the record of data.

With reference to FIGS. 1 and 2, the processor 202 can be configured to perform an operation 216 on a set of information. The operation 216 can confirm that a format of a first element of the set of information and a format of a second element of the set of information are correct. The set of information can be about an authorization of the record of data. The authorization can be used to cause a second copy of the record of data to be communicated 122 or 124 and 126 via the electronic network 102.

FIG. 4 is a diagram illustrating an example of a format of an element of the set of information, according to the disclosed technologies. For example, the element can be an identification of an approver of the transaction. For example, the identification of the approver can be a digital signature. For example, the format of the element can be: transaction ID, identification of the approver. For example, with reference to FIGS. 2 and 4, FIG. 4 illustrates that: (1) the first element is for the transaction with transaction ID 98765 and the first element includes an identification that the approver is Alice Jones and (2) the second element is for the transaction with transaction ID 98765 and the second element includes an identification that the approver is Charlie Sanders.

Returning to FIG. 2, the processor 202 can be configured to perform an operation 218 on the first element and the second element. The operation 218 can confirm that a subject matter referenced by the first element is a same as a subject matter referenced by the second element and is a same as a subject matter of the record of data. For example, with reference to FIGS. 3 and 4, the subject matter referenced by the first element (transaction ID 98765) is the same as the subject matter referenced by the second element (transaction ID 98765) and is the same as the subject matter of the record of data (transaction ID 98765).

With reference to FIGS. 2 and 4, the processor 202 can be configured to perform an operation 220. The operation 220 can retrieve, from the memory 204, a second credential and a third credential. The second credential can be associated with an entity that produced the first element (i.e., the approver (e.g., Alice Jones)). The third credential can be associated with an entity that produced the second element (i.e., the approver (e.g., Charlie Sanders)).

The processor 202 can be configured to perform, using the second credential and the third credential, an operation 222. The operation 222 can confirm that the entity that produced the first element was authorized to produce the first element (i.e., the approver (e.g., Alice Jones)) and that the entity that produced the second element was authorized to produce the second element (i.e., the approver (e.g., Charlie Sanders)).

With reference to FIGS. 1 and 2, the processor 202 can be configured to perform an operation 224 on the set of information. The operation 224 can confirm that the set of information is sufficient to authorize causing the second copy of the record of data to be communicated 122 or 124 and 126 via the electronic network 102.

FIG. 5 is a diagram illustrating an example of an information about requirements for sets of information, according to the disclosed technologies. The information about the requirements for the sets of information can be used to confirm that the set of information is sufficient to authorize causing the second copy of the record of data to be communicated 122 or 124 and 126 via the electronic network 102. For example, the information about the requirements for the sets of information can include: type ID, type definition, and required information. For example: (1) information associated with a type ID 0001 can have a type definition of "transaction of less than $1 million" and a required information of "transaction ID" and "two approvers" and (2) information associated with a type ID 0002 can have a type definition of "transaction of $1 million or more" and a required information of "transaction ID" and "three approvers". With reference to FIGS. 2, 4, and 5, the processor 202 can be configured to perform the operation 224 on the set of information to confirm that the set of information is sufficient to authorize causing the second copy of the record of data to be communicated 122 or 124 and 126 via the electronic network 102 because the set of information includes: (1) transaction ID 98765, (2) a first approver (e.g., Alice Jones), and (3) a second approver (e.g., Charlie Sanders).

In a fourth optional implementation of the disclosed technologies, the processor 202 can be configured to perform, in response to a completion of the operations 210, 216, 218, 220, 222, and 224, an operation 226. The operation 226 can retrieve, from the memory 204, a fourth credential.

In the fourth optional implementation, the processor 202 can be configured to perform, in response to a retrieval of the fourth credential, an operation 228. The operation 228 can produce a signal 230. The signal 230 can include the fourth credential.

Alternatively, in a fifth optional implementation of the disclosed technologies, the processor 202 can be configured to cause, in response to the completion of the operations 210, 216, 218, 220, 222, and 224, a signal 232 to be sent. The signal 232 can be sent to the hardware security module 206. The second signal 232 can provide an indication that requirements have been met for the second copy of the record of data to be communicated 122 or 124 and 126 via the electronic network 102.

In the fifth optional implementation, the hardware security module 206 can be configured to perform, in response to a receipt of the signal 232, additional operations to confirm that the requirements have been met for the second copy of the record of data to be communicated 122 or 124 and 126 via the electronic network 102.

Figure 6:
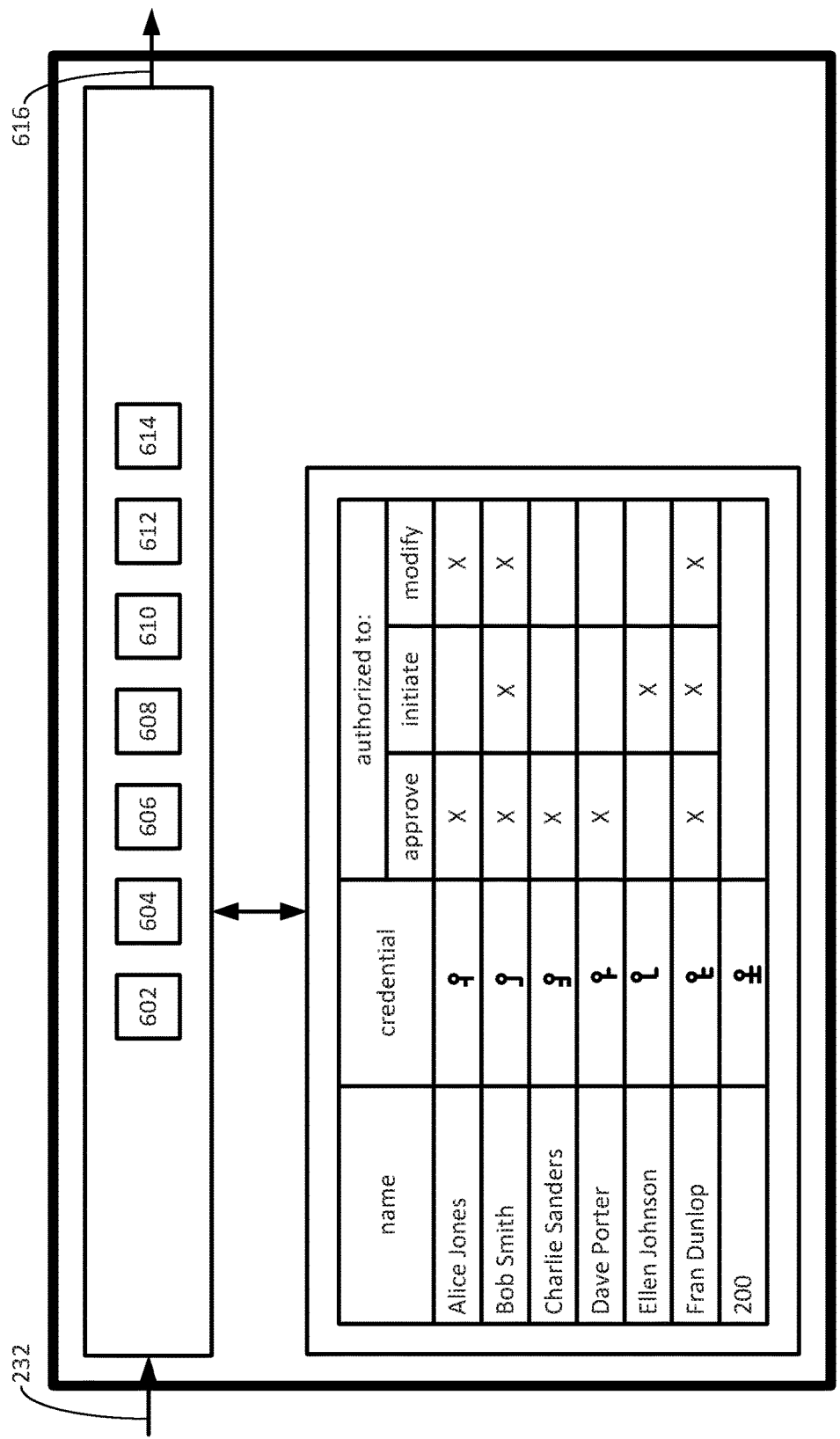
FIG. 6 is a diagram illustrating an example of a hardware security module, according to the disclosed technologies.

FIG. 6 is a diagram illustrating an example of the hardware security module 206, according to the disclosed technologies.

For example, with reference to FIGS. 1, 2, and 6, in a sixth optional implementation of the disclosed technologies, the hardware security module 206 can be configured to perform an operation 602 on the first copy of the record of data. The operation 602 can confirm that the format of the content within the first copy of the record of data is correct.

In the sixth optional implementation, the hardware security module 206 can be configured to perform an operation 604 on the set of information. The operation 604 can confirm that the format of the first element of the set of information and the format of the second element of the set of information are correct.

In the sixth optional implementation, the hardware security module 206 can be configured to perform an operation 606 on the first element and the second element. The operation 606 can confirm that the subject matter referenced by the first element is the same as the subject matter referenced by the second element and is the same as the subject matter of the record of data.

In the sixth optional implementation, the hardware security module 206 can be configured to perform an operation 608. The operation 608 can retrieve the second credential and the third credential.

In the sixth optional implementation, the hardware security module 206 can be configured to perform, using the second credential and the third credential, an operation 610. The operation 610 can confirm that the entity that produced the first element was authorized to produce the first element and that the entity that produced the second element was authorized to produce the second element.

In the sixth optional implementation, the hardware security module 206 can be configured to perform an operation 612 on the set of information. The operation 612 can confirm that the set of information is sufficient to authorize causing the second copy of the record of data to be communicated 122 or 124 and 126 via the electronic network 102.

In the sixth optional implementation, the hardware security module 206 can be configured to perform, in response to a completion of the operations 602, 604, 606, 608, 610, and 612, an operation 614. The operation 614 can retrieve a fifth credential.

In the sixth optional implementation, the hardware security module 206 can be configured to cause, in response to a retrieval of the fifth credential, a signal 616 (e.g., 234) to be sent. The signal 616 (e.g., 234) can be sent to the processor 202. The signal 616 (e.g., 234) can provide an indication of a confirmation that the requirements have been met for the second copy of the record of data to be communicated 122 or 124 and 126 via the electronic network 102. The signal 616 (e.g., 234) can include the fifth credential.

With reference to FIGS. 1 and 2, the processor 202 can be configured to cause, in response to the completion of the operations 210, 216, 218, 220, 222, and 224, the signal 230 (e.g., 128a or 128b; or 130a or 130b) to be sent. The signal 230 can provide the indication that the requirements have been met for the second copy of the record of data to be communicated 122 or 124 and 126 via the electronic network 102. If the system 104 is in the fourth optional implementation, then the processor 202 can be further configured to cause, in response to the completion of the operations 226 and 228, the signal 230 to be sent. If the system 104 is in the fifth optional implementation, then the processor 202 can be further configured to cause, in response to the completion of the additional operations, the signal 230 to be sent. For example, if the system 104 is in the sixth optional implementation, then the processor 202 can be further configured to cause, in response to a receipt of the signal 234, the signal 230 to be sent.

The device 106 can be configured to receive a signal 128a or 130a (e.g., 230). The signal 128a or 130a can provide a first indication that requirements have been met for the second copy of the record of data to be transmitted 122 or 124 and 126 to the electronic network 102. The device 106 can be configured to receive a signal 128b or 130b (e.g., 230). The signal 128b or 130b can provide a second indication that requirements have been met for the second copy of the record of data to be transmitted 122 or 124 and 126 to the electronic network 102.

In a seventh optional implementation of the disclosed technologies, the device 108a can be configured to send, to the device 106, the signal 128a (e.g., 230). The device 106 can be configured to receive, from the device 108a, the signal 128a (e.g., 230). The device 108b can be configured to send, to the device 106, the signal 128b (e.g., 230). The device 106 can be configured to receive, from the device 108b, the signal 128b (e.g., 230).

Alternatively, in an eighth optional implementation of the disclosed technologies, the device 108a can be configured to send, to the device 118 outside of the system 104, the signal 130a (e.g., 230). The device 106 can be configured to receive 132, from the device 118 outside of the system 104, the signal 130a (e.g., 230). The device 108b can be configured to send, to the device 118 outside of the system 104, the signal 130b (e.g., 230). The device 106 can be configured to receive 132, from the device 118 outside of the system 104, the signal 130b (e.g., 230).

If the system 104 is in the fourth optional implementation, then the device 106 can be configured to determine, in response to one or more of a reception of the signal 128a or 130a or a reception of the signal 128b or 130b, that one or more of the signal 128a or 130a includes the fourth credential or the signal 128b or 130b includes the fourth credential. If the system 104 is in the sixth optional implementation, then the device 106 can be configured to determine, in response to one or more of the reception of the signal 128a or 130a or the reception of the signal 128b or 130b, that one or more of the signal 128a or 130a includes the fifth credential or the signal 128b or 130b includes the fifth credential.

The device 106 can be configured to cause, in response to the reception of the signal 128a or 130a and the reception of the signal 128b or 130b, the second copy of the record of data to be transmitted 122 to the electronic network 102. Optionally, the device 106 can be configured to cause the second copy of the record of data to be transmitted to the electronic network 102 by sending 124 the second copy of the record of data to a device 134 outside of the system 104. The second copy of the record of data can be transmitted 126 to the electronic network 102 by the device 134 outside of the system 104. If the system 104 is in the fourth optional implementation, then the device 106 can be further configured to cause, in response to a determination that one or more of the signal 128a or 130a includes the fourth credential or the signal 128b or 130b includes the fourth credential, the second copy of the record of data to be transmitted 122 or 124 and 126 to the electronic network 102. If the system 104 is in the sixth optional implementation, then the device 106 can be further configured to cause, in response to a determination that one or more of the signal 128a or 130a includes the fifth credential or the signal 128b or 130b includes the fifth credential, the second copy of the record of data to be transmitted 122 or 124 and 126 to the electronic network 102.

The processor 202 can be configured to prevent, in response to a lack of a completion of any of the operations 210, 216, 218, 220, 222, or 224, the signal 230 (e.g., 128a or 128b; or 130a or 130b) from being sent. If the system 104 is in the fourth optional implementation, then the processor 202 can be configured to prevent, in response to a lack of a completion of any of the operations 210, 216, 218, 220, 222, 224, 226, or 228, the signal 230 (e.g., 128a or 128b; or 130a or 130b) from being sent. If the system 104 is in the fifth optional implementation, then the processor 202 can be configured to prevent, in response to a lack of a completion of any of the operations 210, 216, 218, 220, 222, 224, 226, 228, or any of the additional operations, the signal 230 (e.g., 128a or 128b; or 130a or 130b) from being sent. For example, if the system 104 is in the sixth optional implementation, then the processor 202 can be configured to prevent, in response to a lack of a completion of any of the operations 210, 216, 218, 220, 222, 224, 226, 228, any of the additional operations, or the receipt of the signal 234, the signal 230 (e.g., 128a or 128b; or 130a or 130b) from being sent.

The device 106 can be configured to prevent, in response to a lack of the reception of the signal 128a or 130a or a lack of the reception of the signal 128b or 130b, the second copy of the record of data from being transmitted 122 or 124 and 126 to the electronic network 102. If the system 104 is in the fourth optional implementation, then the device 106 can be configured to prevent, in response to the lack of the reception of the signal 128a or 130a, the lack of the reception of the signal 128b or 130b, or a lack of the determination that one or more of the signal 128a or 130a includes the fourth credential or the signal 128b or 130b includes the fourth credential, the second copy of the record of data from being transmitted 122 or 124 and 126 to the electronic network 102. If the system 104 is in the sixth optional implementation, then the device 106 can be configured to prevent, in response to the lack of the reception of the signal 128a or 130a, the lack of the reception of the signal 128b or 130b, or a lack of the determination that one or more of the signal 128a or 130a includes the fifth credential or the signal 128b or 130b includes the fifth credential, the second copy of the record of data from being transmitted 122 or 124 and 126 to the electronic network 102.

In a ninth optional implementation of the disclosed technologies, the processor 202 can be configured to cause, in response to a lack of a completion of any of the operations 210, 216, 218, 220, 222, or 224, a signal 236 (e.g., 136a or 136b) to be sent. The signal 236 can provide an indication that the requirements have not been met for the second copy of the record of data to be communicated 122 or 124 and 126 via the electronic network 102. The device 108a can be configured to send, to the device 106, the signal 136a (e.g., 236). The device 106 can be configured to receive, from the device 108a, the signal 136a (e.g., 236). The device 108b can be configured to send, to the device 106, the signal 136b (e.g., 236). The device 106 can be configured to receive, from the device 108b, the signal 136b (e.g., 236). The device 106 can be configured to prevent, in response to one or more of a reception of the signal 136a or a reception of the signal 136b, the second copy of the record of data from being transmitted 122 or 124 and 126 to the electronic network 102.

In a tenth optional implementation of the disclosed technologies, the plurality of other devices 108 can further include a device 108c. In the second and tenth optional implementations, the device 106 can be configured to send 114c, to the device 108c, the copy of the record of data. The device 108c can be configured to receive 114c, from the device 106, the copy of the record of data. In the third and tenth optional implementations, the device 108c can be configured to receive 120c, from the device 118 outside of the system 104, the copy of the record of data.

In the tenth optional implementation, the device 108c can be configured to cause, in response to the completion of the operations 210, 216, 218, 220, 222, and 224, a signal 128c or 130c to be sent. If the system 104 is in the fourth and tenth optional implementations, then the device 108c can be further configured to cause, in response to the completion of the operations 226 and 228, the signal 128c or 130c to be sent. The device 106 can be configured to receive the signal 128c or 130c. The signal 128c or 130c can provide a third indication that requirements have been met for the second copy of the record of data to be transmitted 122 or 124 and 126 to the electronic network 102. Optionally, the device 106 can be configured to cause, in response to the reception of the signal 128a or 130a, the reception of the signal 128b or 130b, and a reception of the signal 128c or 130c, the second copy of the record of data to be transmitted 122 or 124 and 126 to the electronic network 102. That is, under this option, the second copy of the record of data can be transmitted 122 or 124 and 126 to the electronic network 102 in response to receptions of all of the signal 128a or 130a, the signal 128b or 130b, and the signal 128c or 130c. Alternatively, the second copy of the record of data can be transmitted 122 or 124 and 126 to the electronic network 102 in response to receptions of a majority of signals from among the signal 128a or 130a, the signal 128b or 130b, and the signal 128c or 130c.

In the tenth optional implementation, the device 106 can be configured to prevent, in response to the lack of the reception of the signal 128a or 130a, the lack of the reception of the signal 128b or 130b, or the lack of the reception of the signal 128c or 130c, the second copy of the record of data from being transmitted 122 or 124 and 126 to the electronic network 102. If the system 104 is in the fourth and tenth optional implementations, then the device 106 can be configured to prevent, in response to the lack of the reception of the signal 128a or 130a, the lack of the reception of the signal 128b or 130b, the lack of the reception of the signal 128c or 130c, or the lack of the determination that one or more of the signal 128a or 130a includes the fourth credential, the signal 128b or 130b includes the fourth credential, or the signal 128c or 130c includes the fourth credential, the second copy of the record of data from being transmitted 122 or 124 and 126 to the electronic network 102. If the system 104 is in the sixth and tenth optional implementations, then the device 106 can be configured to prevent, in response to the lack of the reception of the signal 128a or 130a, the lack of the reception of the signal 128b or 130b, the lack of the reception of the signal 128c or 130c, or the lack of the determination that one or more of the signal 128a or 130a includes the fifth credential, the signal 128b or 130b includes the fifth credential, or the signal 128c or 130c includes the fifth credential, the second copy of the record of data from being transmitted 122 or 124 and 126 to the electronic network 102.

If the system 104 is in the ninth and tenth optional implementations, then the device 108c can be configured to cause, in response to the lack of the completion of any of the operations 210, 216, 218, 220, 222, or 224, a signal 136c to be sent. The signal 136c can provide an indication that the requirements have not been met for the second copy of the record of data to be communicated 122 or 124 and 126 via the electronic network 102. The device 106 can be configured to receive, from the device 108c, the signal 136c. The device 106 can be configured to prevent, in response to one or more of the reception of the signal 136*a*, the reception of the signal 136*b*, or a reception of the signal 136*c*, the second copy of the record of data from being transmitted 122 or 124 and 126 to the electronic network 102.

In an eleventh optional implementation of the disclosed technologies, the processor 202 can be configured to perform an operation 238 on an instruction. The operation 238 can confirm that a format of the instruction is correct. The instruction can be about a modification to a requirement associated with one or more of the operations 210, 216, 218, 220, 222, or 224.

FIG. 7 is a diagram illustrating an example of a format of an instruction to modify a requirement for causing a transmission of the copy of the record of data to the electronic network, according to the disclosed technologies. For example, the format of the instruction can be: type ID, modification, ID of modifier, ID of first approver, ID of second approver, and ID of third approver. For example, with reference to FIGS. 2, 5, and 7, FIG. 7 illustrates that: (1) the instruction is for "transaction of $1 million or more" (type ID 0002), (2) the modification to the requirement is a change from "three approvers" to "four approvers", (3) an ID of the modifier is Fran Dunlop, (4) an ID of the first approver is Bob Smith, (5) an ID of the second approver is Alice Jones, and (6) an ID of the third approver is Charlie Sanders.

Returning to FIG. 2, in the eleventh optional implementation, the processor 202 can be configured to perform an operation 240. The operation 240 can retrieve, from the memory 204, a sixth credential. The sixth credential can be associated with an entity that produced the instruction (i.e., the modifier (e.g., Fran Dunlop)).

In the eleventh optional implementation, the processor 202 can be configured to perform, using the sixth credential, an operation 242. The operation 242 can confirm that the entity that produced the instruction was authorized to produce the instruction.

In the eleventh optional implementation, the processor 202 can be configured to cause, in response to a completion of the operations 238, 240, and 242, the instruction to be implemented.

FIGS. 8A through 8D are a flow diagram illustrating an example of a method 800 for preventing the erroneous transmission of the copy of a record of data to the electronic network, according to the disclosed technologies. For example, the record of data can be associated with a transaction.

With reference to FIG. 8A, in the method 800, at an optional operation 802, a first copy of the record of data can be received from another processor of a system for preventing the erroneous transmission of a copy of the record of data to the electronic network.

Alternatively, at an optional operation 804, the first copy of the record of data can be received from a device outside of the system for preventing the erroneous transmission of the copy of the record of data to the electronic network.

An operation 806 can be performed on the first copy of the record of data. The operation can confirm that a format of a content with the first copy of the record of data is correct.

An operation 808 can be performed on a set of information. The operation can confirm that a format of a first element of the set of information and a format of a second element of the set of information are correct. The set of information can be about an authorization of the record of data. The authorization can be used to cause a second copy of the record of data to be communicated via the electronic network. One or more of the first element or the second element can include a digital signature.

An optional operation 810 can be performed to retrieve a first credential from a memory. The first credential can be associated with an entity that produced the record of data.

An optional operation 812 can be performed, using the first credential, to confirm that the entity that produced the record of data was authorized to produce the record of data.

With reference to FIG. 8B, in the method 800, an operation 814 can be performed on the first element and the second element to confirm that a subject matter referenced by the first element is a same as a subject matter referenced by the second element and is a same as a subject matter of the record of data.

An operation 816 can be performed to retrieve, from the memory, a second credential and a third credential. The first credential can be associated with an entity that produced the first element. The second credential can be associated with an entity that produced the second element.

An operation 818 can be performed, using the second credential and the third credential, to confirm that the entity that produced the first element was authorized to produce the first element and that the entity that produced the second element was authorized to produce the second element.

An operation 820 can be performed on the set of information to confirm that the set of information is sufficient to authorize causing the second copy of the record of data to be communicated via the electronic network.

An optional operation 822 can be performed to retrieve, in response to a completion of the operations 806, 808, 814, 816, 818, and 820 and from the memory, a fourth credential.

Figure 8C:
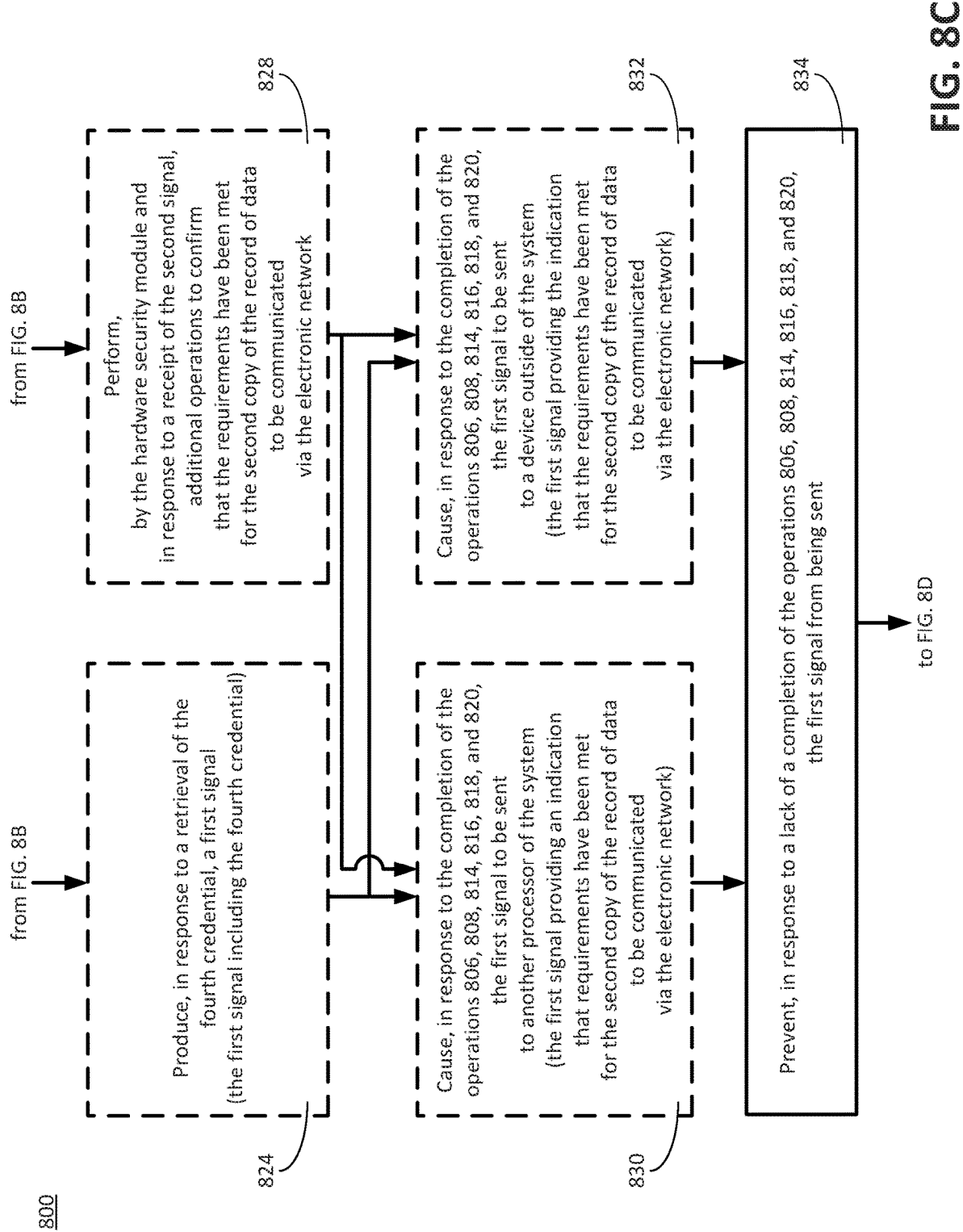

With reference to FIG. 8C, in the method 800, an optional operation 824 can be performed to produce, in response to a retrieval of the fourth credential, a first signal. The first signal can include the fourth credential.

With reference to FIG. 8B, in the method 800, alternatively, an optional operation 826 can be performed to cause, in response to the completion of the operations 806, 808, 814, 816, 818, and 820, a second signal to be sent. The second signal can be sent to a hardware security module. The second signal can provide an indication that requirements have been met for the second copy of the record of data to be communicated via the electronic network.

With reference to FIG. 8C, in the method 800, according to this alternative, an optional operation 828 can be performed, by the hardware security module and in response to a receipt of the second signal, additional operations to confirm that the requirements have been met for the second copy of the record of data to be communicated via the electronic network.

Figure 9B:
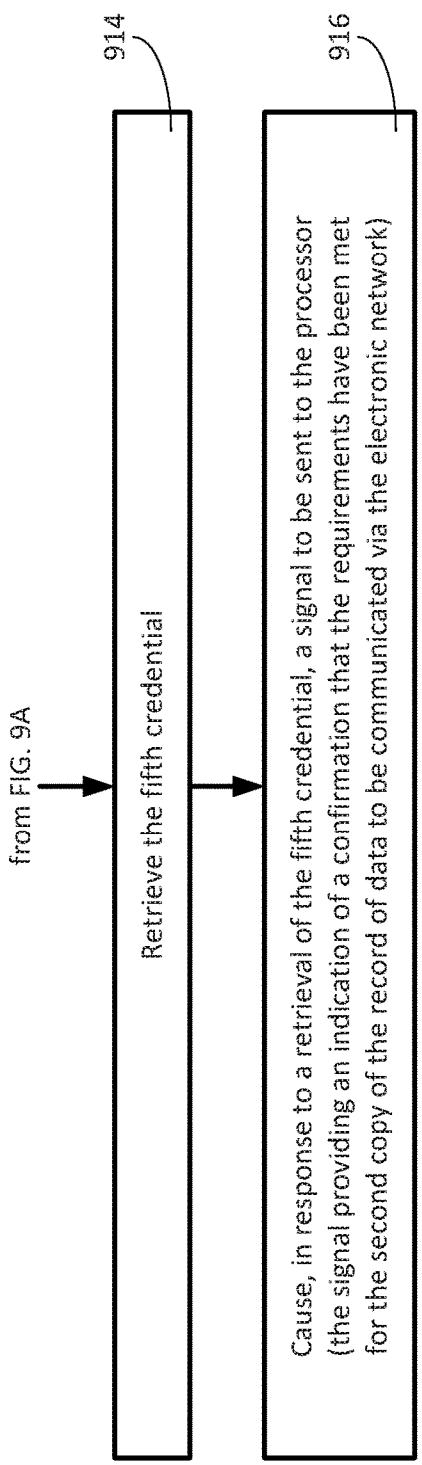

For example, FIGS. 9A and 9B are a flow diagram illustrating an example of a method 900 for performing, by the hardware security module, the additional operations to confirm that the requirements have been met for the second copy of the record of data to be communicated via the electronic network, according to the disclosed technologies.

With reference to FIG. 9A, in the method 900, an operation 902 can be performed to confirm that the format of the content within the first copy of the record of data is correct.

An operation 904 can be performed on the set of information. The operation 904 can confirm that the format of the first element of the set of information and the format of the second element of the set of information are correct.

An operation 906 can be performed on the first element and the second element. The operation 906 can confirm that the subject matter referenced by the first element is the same as the subject matter referenced by the second element and is the same as the subject matter of the record of data.

An operation 908 can be performed to retrieve the second credential and the third credential.

An operation 910 can be performed, using the second credential and the third credential, to confirm that the entity that produced the first element was authorized to produce the first element and that the entity that produced the second element was authorized to produce the second element.

An operation 912 can be performed on the set of information. The operation 912 can confirm that the set of information is sufficient to authorize causing the second copy of the record of data to be communicated via the electronic network.

With reference to FIG. 9B, in the method 900, an operation 914 can be performed, in response to a completion of the operations 902, 904, 906, 908, 910, and 912, to retrieve the fifth credential.

An operation 916 can be performed to cause, in response to a retrieval of the fifth credential, a signal to be sent. The signal can be sent to the processor. The signal can provide an indication of a confirmation that the requirements have been met for the second copy of the record of data to be communicated via the electronic network 102. The signal can include the fifth credential.

With reference to FIG. 8C, in response to the completion of the operations 806, 808, 814, 816, 818, and 820, the first signal can be caused to be sent. The first signal can provide an indication that requirements have been met for the second copy of the record of data to be communicated via the electronic network. If the method 800 includes performing the operations 822 and 824, then the first signal can further be caused to be sent in response to a completion of the operations 822 and 824. If the method 800 includes performing the operations 826 and 828, then the first signal can further by caused to be sent in response to a completion of the operations 826 and 828. At an optional operation 830, the first signal can be caused to be sent to another processor of a system for preventing the erroneous transmission of the copy of the record of data to the electronic network. Alternatively, at an optional operation 832, the first signal can be caused to be sent to a device outside of the system for preventing the erroneous transmission of the copy of the record of data to the electronic network.

At an operation 834, in response to a lack of a completion of any of the operations 806, 808, 814, 816, 818, or 820, the first signal can be prevented from being sent. If the method 800 includes performing the operations 822 and 824, then the first signal can be prevented from being sent in response to a lack of a completion of any of the operations 806, 808, 814, 816, 818, 820, 822, or 824. If the method 800 includes performing the operations 826 and 828, then the first signal can be prevented from being sent in response to a lack of a completion of any of the operations 806, 808, 814, 816, 818, 820, 826, or 828.

At an optional operation 836, in response to the lack of the completion of any of the operations 806, 808, 814, 816, 818, or 820, a third signal can be caused to be sent. The third signal can provide an indication that the requirements have not been met for the second copy of the record of data to be communicated via the electronic network.

Figure 10:
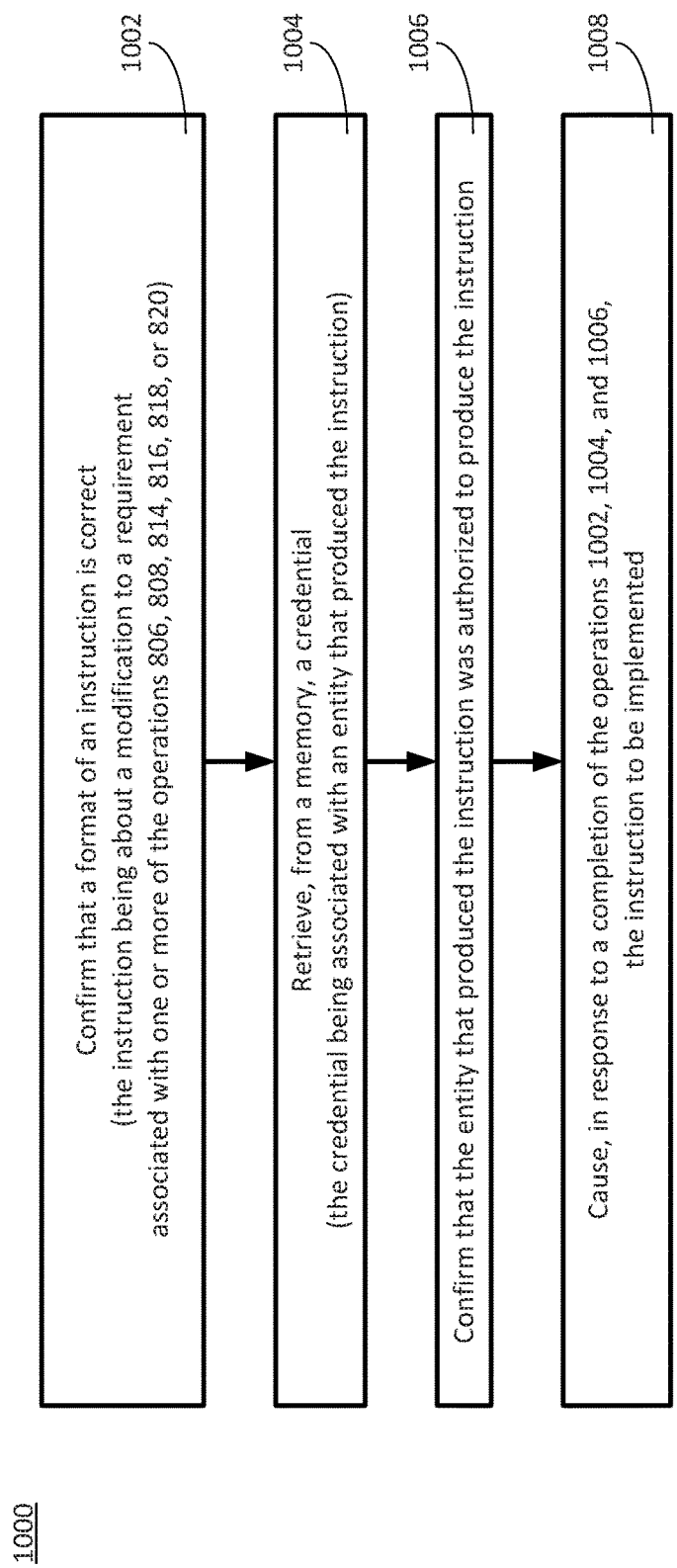
FIG. 10 is a flow diagram illustrating an example of a method for modifying a requirement associated with an operation to prevent the erroneous transmission of the copy of the record of data to the electronic network, according to the disclosed technologies.

FIG. 10 is a flow diagram illustrating an example of a method 1000 for modifying a requirement associated with an operation to prevent the erroneous transmission of the copy of the record of data to the electronic network, according to the disclosed technologies.

In the method 1000, at an operation 1002, an operation can be performed on an instruction to confirm that a format of the instruction is correct. The instruction can be about a modification to a requirement associated with one or more of the operations 806, 808, 814, 816, 818, or 820.

At an operation 1004, a retrieval can be performed, by the processor and from a hardware security module of a node of a distributed ledger system, of a credential associated with an entity that produced the instruction.

At an operation 1006, a second operation can be performed, by the processor and using the credential associated with the entity that produced the instruction, to confirm that the entity that produced the instruction was authorized to produce the instruction.

At an operation 1008, the instruction can be caused, by the processor and in response to a completion of the first operation, the retrieval, and the second operation, to be implemented in the node.

Figure 11A:
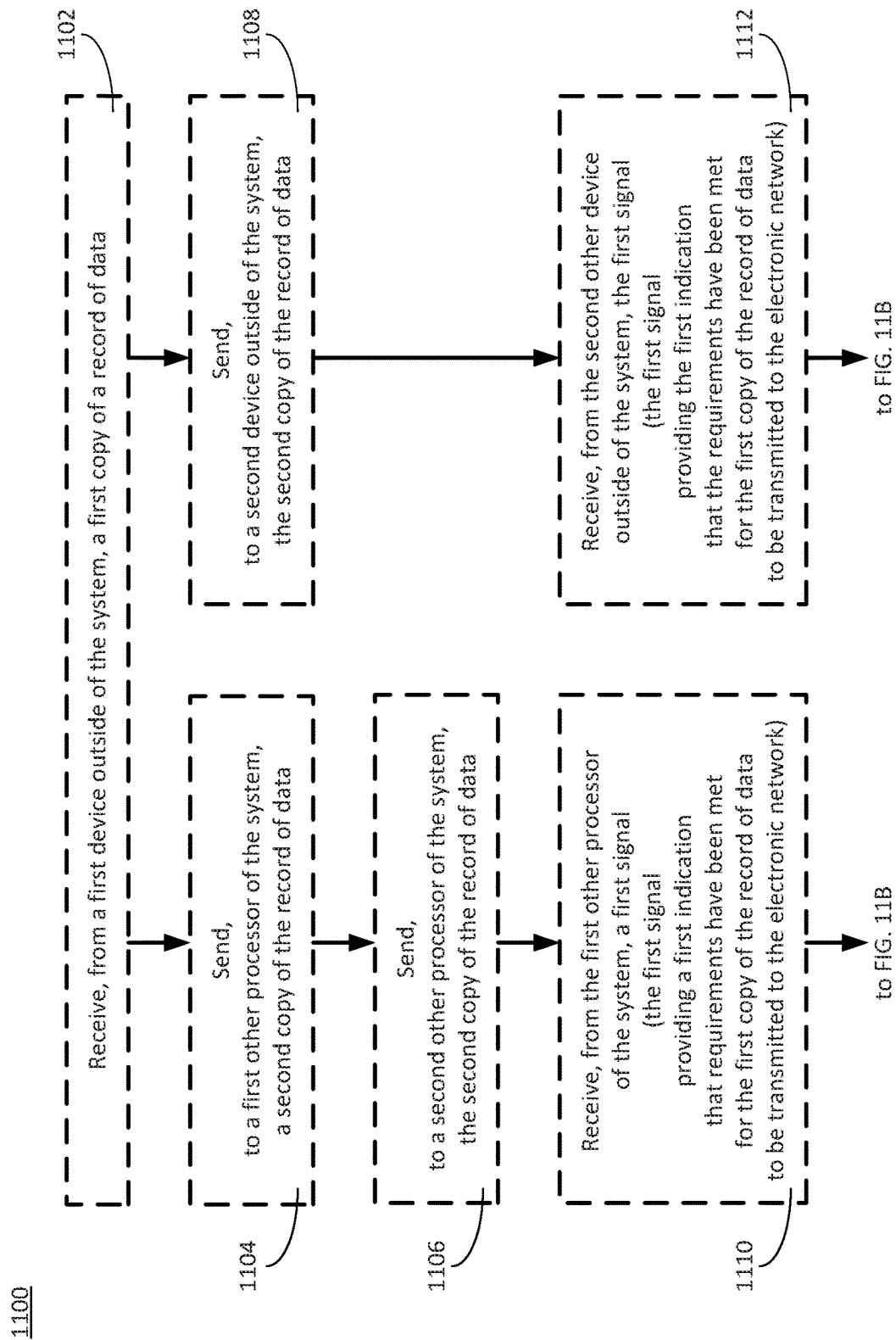

FIGS. 11A through 11C are a flow diagram illustrating an example of a method 1100 for preventing the erroneous transmission of the copy of a record of data to the electronic network, according to the disclosed technologies. For example, the record of data can be associated with a transaction. The electronic network can include a distributed ledger system. If the record of data is associated with a transaction, then, additionally or alternatively, the electronic network can include one or more of an Automated Clearing House network, a payment rail network, another electronic ledger system, or the like. If the electronic network is a distributed ledger system, then the record of data can be included, by the distributed ledger system, in a block to be added, by the distributed ledger system, to a blockchain.

With reference to FIG. 11A, in the method 1100, at an optional operation 1102, a first copy of the record of data can be received from a first device outside of a system for preventing the erroneous transmission of the copy of the record of data to the electronic network.

At an optional operation 1104, a second copy of the record of data can be sent to a first other processor of the system for preventing the erroneous transmission of the copy of the record of data to the electronic network.

At an optional operation 1106, the second copy of the record of data can be sent to a second other processor of the system for preventing the erroneous transmission of the copy of the record of data to the electronic network.

Alternatively, at an optional operation 1108, the second copy of the record of data can be sent to a second device outside of the system for preventing the erroneous transmission of the copy of the record of data to the electronic network. The second copy of the record of data can be transmitted, by the second device outside of the system for preventing the erroneous transmission of the copy of the record of data to the electronic network, to the first other processor of the system for preventing the erroneous transmission of the copy of the record of data to the electronic network and to the second other processor of the system for preventing the erroneous transmission of the copy of the record of data to the electronic network.

A first signal can be received. The first signal can provide a first indication that requirements have been met for the first copy of the record of data to be transmitted to the electronic network. At an optional operation 1110, the first signal can be received from the first other processor of the system for preventing the erroneous transmission of the copy of the record of data to the electronic network. Alternatively, at an optional operation 1112, the first signal can be received from a second other device outside of the system for preventing the erroneous transmission of the copy of the record of data to the electronic network.

With reference to FIG. 11B, in the method 1100, a second signal can be received. The second signal can provide a second indication that the requirements have been met for the first copy of the record of data to be transmitted to the electronic network. At an optional operation 1114, the second signal can be received from the second other processor of the system for preventing the erroneous transmission of the copy of the record of data to the electronic network. Alternatively, at an optional operation 1116, the second signal can be received from the second other device outside of the system for preventing the erroneous transmission of the copy of the record of data to the electronic network.

At an optional operation 1118, a third signal can be received. The third signal can provide a third indication that the requirements have been met for the first copy of the record of data to be transmitted to the electronic network.

At an optional operation 1120, a determination can be made, in response to one or more of a reception of the first signal or a reception of the second signal, that one or more of the first signal or the second signal includes a credential associated with another processor of the system for preventing the erroneous transmission of the copy of the record of data to the electronic network.

With reference to FIG. 11C, in the method 1100, at an optional operation 1122, a fourth signal can be received. The fourth signal can provide an indication that that the requirements have not been met for the first copy of the record of data to be transmitted to the electronic network.

At an operation 1124, in response to the reception of the first signal and the reception of the second signal, the first copy of the record of data can be caused to be transmitted to the electronic network. Optionally, the first copy of the record of data can be caused to be transmitted to the electronic network by sending the first copy of the record of data to a third device outside of the system for preventing the erroneous transmission of the copy of the record of data to the electronic network. The first copy of the record of data can be transmitted to the electronic network by the third device outside of the system for preventing the erroneous transmission of the copy of the record of data to the electronic network.

If the method 1100 includes performing the operation 1118, then the first copy of the record of data can further be caused to be transmitted to the electronic network in response to a reception of the third signal. That is, the first copy of the record of data can be transmitted to the electronic network in response to receptions of all of the first signal, the second signal, and the third signal. Alternatively, the first copy of the record of data can be transmitted to the electronic network in response to receptions of a majority of signals from among the first signal, the second signal, and the third signal.

If the method 1100 includes performing the operation 1120, then the first copy of the record of data can further be caused to be transmitted to the electronic network in response to a determination that one or more of the first signal or the signal includes the credential.

At an operation 1126, in response to a lack of the reception of the first signal or a lack of the reception of the second signal, the first copy of the record of data can be prevented from being transmitted to the electronic network.

If the method 1100 includes performing the operation 1118, then the first copy of the record of data can be prevented from being transmitted to the electronic network in response to the lack of the reception of the first signal or the lack of the reception of the second signal can include preventing the transmission of the first copy of the record of data in response to the lack of the reception of the first signal, the lack of the reception of the second signal, or the lack of the reception of the third signal.

If the method 1100 includes performing the operation 1120, then the first copy of the record of data can be prevented from being transmitted to the electronic network in response to the lack of the reception of the first signal or the lack of the reception of the second signal can include preventing the transmission of the first copy of the record of data in response to the lack of the reception of the first signal, the lack of the reception of the second signal, or a lack of the determination that one or more of the first signal or the second signal includes the credential.

At an optional operation 1128, in response to a reception of the fourth signal, the first copy of the record of data can be prevented from being transmitted to the electronic network.

In general, in light of the technologies described above, one of skill in the art understands that technologies to prevent an erroneous transmission of a copy of a record of data to an electronic network can include any combination of some or all of the foregoing configurations.

Figure 12:
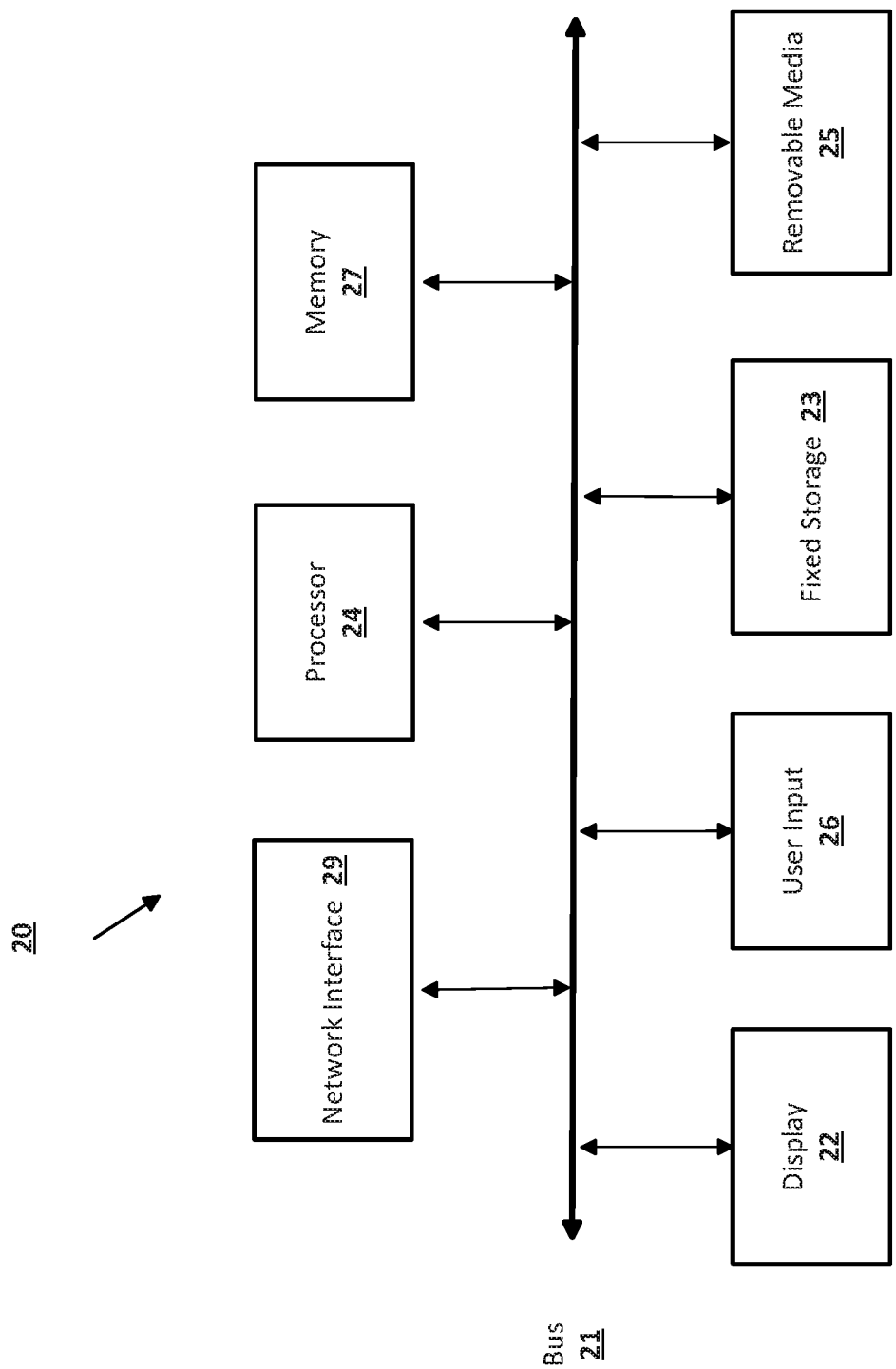
FIG. 12 illustrates an example computing device suitable for implementing configurations of the disclosed technologies.

Configurations of the disclosed technologies may be implemented in and used with a variety of component and network architectures. FIG. 12 illustrates an example computing device 20 suitable for implementing configurations of the disclosed technologies. The device 20 can be, for example, a desktop or laptop computer, or a mobile computing device such as a smart phone, tablet, or the like. The device 20 can include a bus 21 (which can interconnect major components of the computer 20, such as a central processor 24), a memory 27 (such as random-access memory (RAM), read-only memory (ROM), flash RAM, or the like), a user display 22 (such as a display screen), a user input interface 26 (which can include one or more controllers and associated user input devices such as a keyboard, mouse, touch screen, and the like), a fixed storage 23 (such as a hard drive, flash storage, and the like), a removable media component 25 (operative to control and receive an optical disk, flash drive, and the like), and a network interface 29 operable to communicate with one or more remote devices via a suitable network connection.

The bus 21 can allow data communication between the central processor 24 and one or more memory components, which can include RAM, ROM, and other memory, as previously noted. Typically RAM can be the main memory into which an operating system and application programs are loaded. A ROM or flash memory component can contain, among other code, the basic input-output system (BIOS) which can control basic hardware operation such as the interaction with peripheral components. Applications resident with the computer 20 can generally be stored on and accessed via a computer readable medium, such as a hard disk drive (e.g., fixed storage 23), an optical drive, floppy disk, or other storage medium.

The fixed storage 23 can be integral with the computer 20 or can be separate and accessed through other interfaces. The network interface 29 can provide a direct connection to a remote server via a wired or wireless connection. The network interface 29 can provide such connection using any suitable technique and protocol as is readily understood by one of skill in the art, including digital cellular telephone, WiFi™, Bluetooth®, near-field, and the like. For example, the network interface 29 can allow the computer to communicate with other computers via one or more local, wide-area, or other communication networks, as described in further detail below.

Many other devices or components (not illustrated) can be connected in a similar manner (e.g., document scanners, digital cameras, and so on). Conversely, all of the components illustrated in FIG. 12 need not be present to practice the disclosed technologies. The components can be interconnected in different ways from that illustrated. The operation of a computer such as that illustrated in FIG. 12 is readily known in the art and is not discussed in detail in this application. Code to implement the disclosed technologies can be stored in computer-readable storage media such as one or more of the memory 27, fixed storage 23, removable media 25, or on a remote storage location.

More generally, various configurations of the presently disclosed technologies can include or be realized in the form of computer-implemented processes and apparatuses for practicing those processes. Configurations also can be realized in the form of a computer program product having computer program code containing instructions embodied in non-transitory and/or tangible media, such as floppy diskettes, CD-ROMs, hard drives, universal serial bus (USB) drives, or any other machine readable storage medium, such that when the computer program code is loaded into and executed by a computer, the computer becomes an apparatus for practicing configurations of the disclosed technologies. Configurations also can be realized in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing configurations of the disclosed technologies. When implemented on a general-purpose microprocessor, the computer program code segments configure the microprocessor to create specific logic circuits.

In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Configurations can be implemented using hardware that can include a processor, such as a general purpose microprocessor and/or an application-specific integrated circuit (ASIC) that embodies all or part of the techniques according to configurations of the disclosed technologies in hardware and/or firmware. The processor can be coupled to memory, such as RAM, ROM, flash memory, a hard disk or any other device capable of storing electronic information. The memory can store instructions adapted to be executed by the processor to perform the techniques according to configurations of the disclosed technologies.

The foregoing description, for purpose of explanation, has been described with reference to specific configurations. However, the illustrative discussions above are not intended to be exhaustive or to limit configurations of the disclosed technologies to the precise forms disclosed. Many modifications and variations are possible in view of the above teachings. The configurations were chosen and described in order to explain the principles of the disclosed technologies and their practical applications, to thereby enable others skilled in the art to utilize those configurations as well as various configurations with various modifications as may be suited to the particular use contemplated.

The invention claimed is:

1. A method for preventing an erroneous transmission of a copy of a record of data to a distributed ledger system, the method comprising:

performing, by a processor, a first operation on a first copy of the record of data, wherein the first operation confirms that a format of a content within the first copy of the record of data is correct;

performing, by the processor, a second operation on a set of information, wherein the second operation confirms that a format of a first element of the set of information and a format of a second element of the set of information are correct, the set of information being about an authorization of the record of data, the authorization being used to cause a second copy of the record of data to be communicated via the distributed ledger system;

performing, by the processor, a third operation on the first element and the second element, wherein the third operation confirms that a subject matter referenced by the first element is a same as a subject matter referenced by the second element and is a same as a subject matter of the record of data;

performing, by the processor, a fourth operation, wherein the fourth operation retrieves, from a memory, a first credential and a second credential, the first credential being associated with an entity that produced the first element, the second credential being associated with an entity that produced the second element;

performing, by the processor and using the first credential and the second credential, a fifth operation, wherein the fifth operation confirms that the entity that produced the first element was authorized to produce the first element and that the entity that produced the second element was authorized to produce the second element;

performing, by the processor, a sixth operation on the set of information, wherein the sixth operation confirms that the set of information is sufficient to authorize causing the second copy of the record of data to be communicated via the distributed ledger system;

causing, by the processor and in response to the completion of the first operation, the second operation, the third operation, the fourth operation, the fifth operation, and the sixth operation, a first signal to be sent to a hardware security module, the first signal providing the indication that the requirements have been met for the second copy of the record of data to be communicated via the distributed ledger system;

performing, by the hardware security module and in response to a receipt of the first signal, additional operations to confirm that the requirements have been met for the second copy of the record of data to be communicated via the distributed ledger system, wherein the additional operations comprise:

performing a seventh operation on the first copy of the record of data, wherein the seventh operation confirms that the format of the content within the first copy of the record of data is correct;

performing an eighth operation on the set of information, wherein the eighth operation confirms that the format of the first element of the set of information and the format of the second element of the set of information are correct;

performing a ninth operation on the first element and the second element, wherein the ninth operation confirms that the subject matter referenced by the first element is the same as the subject matter referenced by the second element and is the same as the subject matter of the record of data;

performing a tenth operation, wherein the tenth operation retrieves the first credential and the second credential;

performing, using the first credential and the second credential, an eleventh operation, wherein the eleventh operation confirms that the entity that produced the first element was authorized to produce the first element and that the entity that produced the second element was authorized to produce the second element;

performing a twelfth operation on the set of information, wherein the twelfth operation confirms that the set of information is sufficient to authorize causing the second copy of the record of data to be communicated via the distributed ledger system;

performing, in response to a completion of the seventh operation, the eighth operation, the ninth operation, the tenth operation, the eleventh operation, and the twelfth operation, a thirteenth operation, wherein the thirteenth operation retrieves a third credential; and causing, in response to a retrieval of the third credential, a second signal to be sent to the processor, providing an indication of a confirmation that the requirements have been met for the second copy of the record of data to be communicated via the distributed ledger system, the second signal including the third credential;

causing, by the processor and in response to a completion of the first operation, the second operation, the third operation, the fourth operation, the fifth operation, the sixth operation, the additional operations, and receipt of the second signal, a third signal to be sent, the third signal providing an indication that requirements have been met for the second copy of the record of data to be communicated via the distributed ledger system; and preventing, by the processor and in response to a lack of a completion of the first operation, the second operation, the third operation, the fourth operation, the fifth operation, the sixth operation, any of the additional operations, or receipt of the third signal, the third signal from being sent.

2. The method of claim 1, wherein the record of data is associated with a transaction.

3. The method of claim 2, wherein the first credential is associated with an entity that produced that record of data.

4. The method of claim 3, wherein the entity that produced the first element is a first approver of the transaction.

5. The method of claim 4, wherein the entity that produced the second element is a second approver of the transaction.

6. The method of claim 5, wherein the second element is a digital signature of a second approver of the transaction.

7. The method of claim 1, wherein at least one of the first element or the second element comprises a digital signature.

8. The method of claim 7, wherein the record of data is associated with a transaction, and the first element is a digital signature of a first approver of the transaction.

9. The method of claim 1, further comprising:
retrieving, from the memory, a fourth credential, the fourth credential being associated with an entity that produced the record of data; and
using the fourth credential confirming that the entity that produced the record of data was authorized to produce the record of data.

10. The method of claim 1, further comprising causing, by the processor and in response to the lack of the completion of the first operation, the second operation, the third operation, the fourth operation, the fifth operation, or the sixth operation, a fourth signal to be sent, the fourth signal providing an indication that the requirements have not been met for the second copy of the record of data to be communicated via the distributed ledger system.

11. The method of claim 1, further comprising:
in response to the completion of the first operation, the second operation, the third operation, the fourth operation, the fifth operation, and the sixth operation, retrieving, from the memory, a fourth credential; and
wherein the causing the third signal to be sent further comprises causing in response to retrieval of the fourth credential; and
wherein the preventing comprises preventing in response to a lack of retrieval of the fourth credential.

12. The method of claim 1, wherein the processor is a component of a system for preventing the erroneous transmission of the copy of the record of data to the distributed ledger system, and further comprising receiving, by the processor and from another processor of the system for preventing the erroneous transmission of the copy of the record of data to the distributed ledger system, the first copy of the record of data.

13. The method of claim 1, further comprising receiving, by the processor and from a device outside of a system for preventing the erroneous transmission of the copy of the record of data to the distributed ledger system, the first copy of the record of data.

14. The method of claim 1, wherein the causing the third signal to be sent comprises causing the third signal to be sent to another processor of a system for preventing the erroneous transmission of the copy of the record of data to the distributed ledger system.

15. The method of claim 1, wherein the causing the third signal to be sent comprises causing the third signal to be sent to a device outside of a system for preventing the erroneous transmission of the copy of the record of data to the distributed ledger system.

16. The method of claim 1, further comprising:
confirming that a format of an instruction is correct, the instruction being about a modification to a requirement associated with at least one of the first operation, the second operation, the third operation, the fourth operation, the fifth operation, or the sixth operation;
retrieving a fourth credential associated with an entity that produced the instruction;
confirming that the entity that produced the instruction was authorized to produce the instruction; and
in response to retrieving the fourth credential and confirming that the entity that produced the instruction was authorized to produce the instruction, causing the instruction to be implemented.

17. The method of claim 1, wherein the record of data is to be included in a block to be added to a blockchain by the distributed ledger system.

18. A non-transitory computer-readable medium storing computer code for controlling a processor to cause the processor to prevent an erroneous transmission of a copy of a record of data to a distributed ledger system, the computer code including instructions to cause the processor to:

perform a first operation on a first copy of the record of data, wherein the first operation confirms that a format of a content within the first copy of the record of data is correct;

perform a second operation on a set of information, wherein the second operation confirms that a format of a first element of the set of information and a format of a second element of the set of information are correct, the set of information being about an authorization of the record of data, the authorization being used to cause a second copy of the record of data to be communicated via the distributed ledger system;

perform a third operation on the first element and the second element, wherein the third operation confirms that a subject matter referenced by the first element is a same as a subject matter referenced by the second element and is a same as a subject matter of the record of data;

perform a fourth operation, wherein the fourth operation retrieves, from a memory, a first credential and a second credential, the first credential being associated with an entity that produced the first element, the second credential being associated with an entity that produced the second element;

using the first credential and the second credential, perform a fifth operation, wherein the fifth operation confirms that the entity that produced the first element was authorized to produce the first element and that the entity that produced the second element was authorized to produce the second element;

perform a sixth operation on the set of information, wherein the sixth operation confirms that the set of information is sufficient to authorize causing the second copy of the record of data to be communicated via the distributed ledger system;

in response to the completion of the first operation, the second operation, the third operation, the fourth operation, the fifth operation, and the sixth operation, cause a first signal to be sent to a hardware security module, the first signal providing the indication that the requirements have been met for the second copy of the record of data to be communicated via the distributed ledger system, wherein the hardware security module is configured to perform additional operations in response to a receipt of the first signal to confirm that the requirements have been met for the second copy of the record of data to be communicated via the distributed ledger system, wherein the additional operations comprise:

performing a seventh operation on the first copy of the record of data, wherein the seventh operation confirms that the format of the content within the first copy of the record of data is correct;

performing an eighth operation on the set of information, wherein the eighth operation confirms that the format of the first element of the set of information and the format of the second element of the set of information are correct;

performing a ninth operation on the first element and the second element, wherein the ninth operation confirms that the subject matter referenced by the first element is the same as the subject matter referenced by the second element and is the same as the subject matter of the record of data;

performing a tenth operation, wherein the tenth operation retrieves the first credential and the second credential;

performing, using the first credential and the second credential, an eleventh operation, wherein the eleventh operation confirms that the entity that produced the first element was authorized to produce the first element and that the entity that produced the second element was authorized to produce the second element;

performing a twelfth operation on the set of information, wherein the twelfth operation confirms that the set of information is sufficient to authorize causing the second copy of the record of data to be communicated via the distributed ledger system;

performing, in response to a completion of the seventh operation, the eighth operation, the ninth operation, the tenth operation, the eleventh operation, and the twelfth operation, a thirteenth operation, wherein the thirteenth operation retrieves a third credential; and causing, in response to a retrieval of the third credential, a second signal to be sent to the processor, providing an indication of a confirmation that the requirements have been met for the second copy of the record of data to be communicated via the distributed ledger system, the second signal including the third credential;

causing, by the processor and in response to a completion of the first operation, the second operation, the third operation, the fourth operation, the fifth operation, the sixth operation, the additional operations, and receipt of the second signal, a third signal to be sent, the third signal providing an indication that requirements have been met for the second copy of the record of data to be communicated via the distributed ledger system; and preventing, by the processor and in response to a lack of a completion of the first operation, the second operation, the third operation, the fourth operation, the fifth operation, the sixth operation, any of the additional operations, or receipt of the third signal, the third signal from being sent.

19. A system for preventing an erroneous transmission of a copy of a record of data to a distributed ledger system, the system comprising:

a memory configured to store a first copy of the record of data, a first credential, and a second credential; and a processor configured to:

perform a first operation on the first copy of the record of data, wherein the first operation confirms that a format of a content within the first copy of the record of data is correct;

perform a second operation on a set of information, wherein the second operation confirms that a format of a first element of the set of information and a format of a second element of the set of information are correct, the set of information being about an authorization of the record of data, the authorization being used to cause a second copy of the record of data to be communicated via the distributed ledger system;

perform a third operation on the first element and the second element, wherein the third operation confirms that a subject matter referenced by the first element is a same as a subject matter referenced by the second element and is a same as a subject matter of the record of data;

perform a fourth operation, wherein the fourth operation retrieves, from the memory, the first credential and the second credential, the first credential being associated with an entity that produced the first element, the second credential being associated with an entity that produced the second element;

using the first credential and the second credential, perform a fifth operation, wherein the fifth operation confirms that the entity that produced the first element was authorized to produce the first element and that the entity that produced the second element was authorized to produce the second element;

perform a sixth operation on the set of information, wherein the sixth operation confirms that the set of information is sufficient to authorize causing the second copy of the record of data to be communicated via the distributed ledger system;

in response to the completion of the first operation, the second operation, the third operation, the fourth operation, the fifth operation, and the sixth operation, cause a first signal to be sent to a hardware security module, the first signal providing the indication that the requirements have been met for the second copy of the record of data to be communicated via the distributed ledger system, wherein the hardware security module is configured to perform additional operations in response to a receipt of the first signal to confirm that the requirements have been met for the second copy of the record of data to be communicated via the distributed ledger system, wherein the additional operations comprise:

performing a seventh operation on the first copy of the record of data, wherein the seventh operation confirms that the format of the content within the first copy of the record of data is correct;

performing an eighth operation on the set of information, wherein the eighth operation confirms that the format of the first element of the set of information and the format of the second element of the set of information are correct;

performing a ninth operation on the first element and the second element, wherein the ninth operation confirms that the subject matter referenced by the first element is the same as the subject matter referenced by the second element and is the same as the subject matter of the record of data;

performing a tenth operation, wherein the tenth operation retrieves the first credential and the second credential;

performing, using the first credential and the second credential, an eleventh operation, wherein the eleventh operation confirms that the entity that produced the first element was authorized to produce the first element and that the entity that produced the second element was authorized to produce the second element;

performing a twelfth operation on the set of information, wherein the twelfth operation confirms that the set of information is sufficient to authorize causing the second copy of the record of data to be communicated via the distributed ledger system;

performing, in response to a completion of the seventh operation, the eighth operation, the ninth operation, the tenth operation, the eleventh operation, and the twelfth operation, a thirteenth operation, wherein the thirteenth operation retrieves a third credential; and causing, in response to a retrieval of the third credential, a second signal to be sent to the processor, providing an indication of a confirmation that the requirements have been met for the second copy of the record of data to be communicated via the distributed ledger system, the second signal including the third credential;

causing, by the processor and in response to a completion of the first operation, the second operation, the third operation, the fourth operation, the fifth operation, the sixth operation, the additional operations, and receipt of the second signal, a third signal to be sent, the third signal providing an indication that requirements have been met for the second copy of the record of data to be communicated via the distributed ledger system; and preventing, by the processor and in response to a lack of a completion of the first operation, the second operation, the third operation, the fourth operation, the fifth operation, the sixth operation, any of the additional operations, or receipt of the third signal, the third signal from being sent.

20. The system of claim 19, wherein the system further comprises the hardware security module.

21. The system of claim 19, wherein the record of data is associated with a transaction.

22. The system of claim 21, wherein the first credential is associated with an entity that produced the record of data.

23. The system of claim 22, wherein the second credential is associated with an entity that produced the first element.

24. The system of claim 23, wherein the entity that produced the first element is a first approver of the transaction.

25. The system of claim 24, wherein the entity that produced the second element is a second approver of the transaction.

26. The system of claim 25, wherein the record of data is associated with a transaction, and the first element is a digital signature of a first approver of the transaction.

27. The system of claim 23, wherein the third credential is associated with an entity that produced the second element.

28. The system of claim 19, wherein at least one of the first element or the second element comprises a digital signature.

29. The system of claim 28, wherein the second element is a digital signature of a second approver of the transaction.

30. The system of claim 19, wherein the record of data is to be included in a block to be added to a blockchain by the system.

31. The system of claim 30, wherein the second credential is associated with an entity that produced the first element.

32. The system of claim 30, wherein the third credential is associated with an entity that produced the second element.

* * * * *